(12) United States Patent
Terashima et al.

(10) Patent No.: US 7,085,483 B2
(45) Date of Patent: Aug. 1, 2006

(54) HEAT ACCUMULATING METHOD AND DEVICE

(75) Inventors: Tetsuo Terashima, Osaka (JP); Motohiro Suzuki, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 134 days.

(21) Appl. No.: 10/828,713

(22) Filed: Apr. 21, 2004

(65) Prior Publication Data

US 2004/0211407 A1 Oct. 28, 2004

(30) Foreign Application Priority Data

Apr. 22, 2003 (JP) .................................. 2003-117576
Jul. 16, 2003 (JP) .................................. 2003-275330

(51) Int. Cl.
*F24H 1/10* (2006.01)

(52) U.S. Cl. ............... 392/485; 165/104.23; 165/10; 392/311

(58) Field of Classification Search ............. 392/485, 392/311; 165/10, 104.11, 104.12, 104.22, 165/104.23
See application file for complete search history.

(56) References Cited

U.S. PATENT DOCUMENTS 4,054,126 A * 10/1977 Ervin, Jr. .................. 126/619
4,406,806 A * 9/1983 Despault et al. ............ 252/70
5,323,843 A * 6/1994 Olszewski et al. .......... 165/10

FOREIGN PATENT DOCUMENTS

| JP | 61-128071 | 6/1986 |
| JP | 05-118593 | 5/1993 |
| JP | 05-172481 | 7/1993 |

OTHER PUBLICATIONS

Chemical Industry Council, Thermal Storage Technology—Theory and Application Thereof I, Sinzansha Sci–tech, Oct. 10, 1996 (partial English translation).

Chemical Industry Council, Thermal Storage Technology—Theory and Application Thereof II, Sinzansha Sci–tech, Aug. 30, 2001 (partial English translation).

* cited by examiner

*Primary Examiner*—Thor S. Campbell
(74) *Attorney, Agent, or Firm*—RatnerPrestia

(57) ABSTRACT

It is not possible to store heat of a domestic hot water supply level at a high density. If thermal storage temperature is T, variation in enthalpy in a chemical reaction is $\Delta H$, variation in entropy is $\Delta S$, and variation in free energy is $\Delta G$, a thermal storage material satisfying a relationship of $T\Delta S \geqq \Delta G$ is used under a condition of $\Delta H > 0$ so as to promote a reaction for putting the thermal storage material in a thermal storage reaction portion in an energy storing state by having supplemental energy added by an electrode portion when putting the thermal storage material in the energy storing state by decomposing or separating it.

16 Claims, 20 Drawing Sheets

Temperature/degrees C

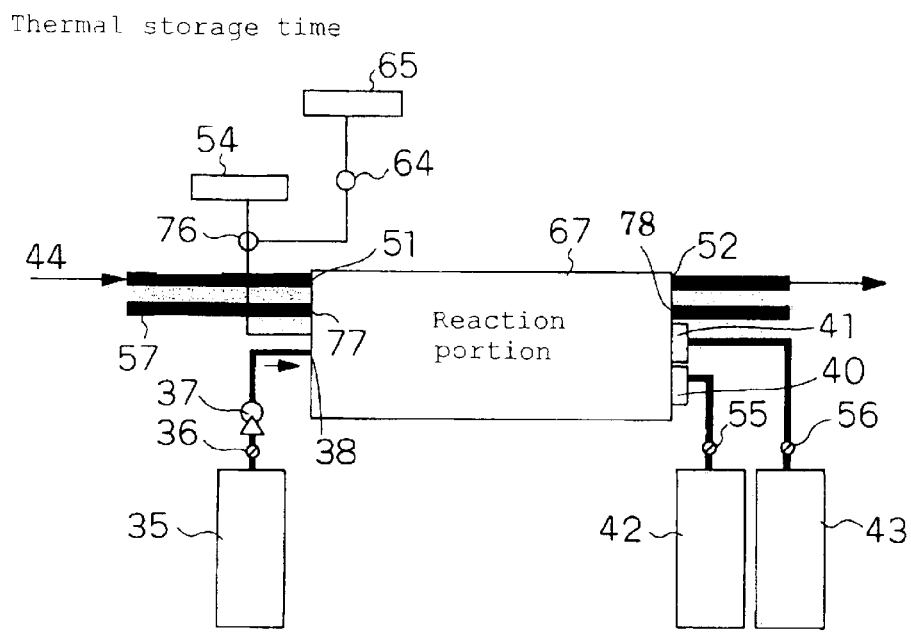
Fig. 14 (A) Thermal storage time
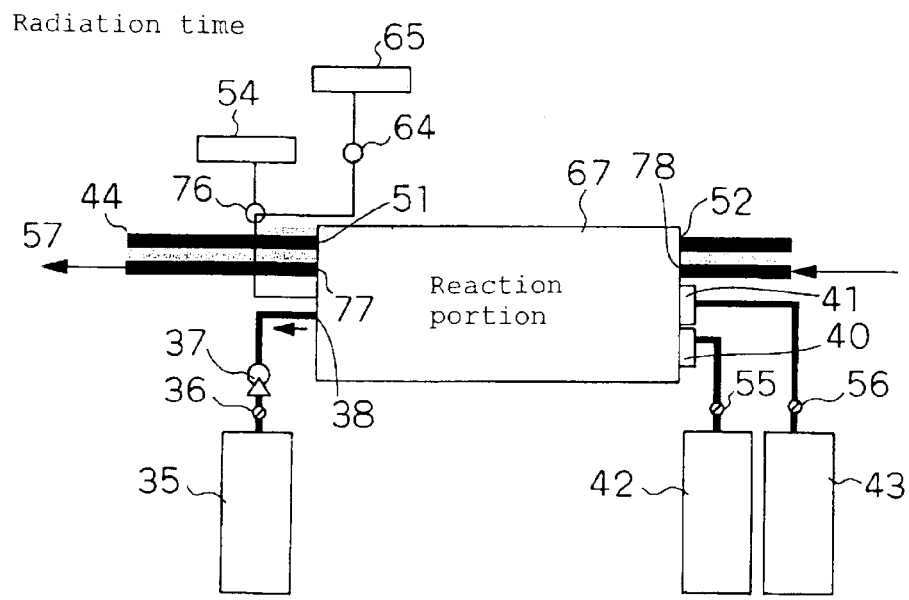
Fig. 14 (B) Radiation time Thermal storage time Radiation time Fig. 16  Radiation time Fig. 17 Radiation time Fig. 19  Radiation time

HEAT ACCUMULATING METHOD AND DEVICE

BACKGROUND OF THE INVENTION

1. Field of the Invention

The present invention relates to a thermal storage method and a thermal storage apparatus of which primary object is thermal storage, and a heat source system using those. For instance, it relates to the thermal storage method, thermal storage apparatus and heat source system used for hot-water supply, heaters and heating.

2. Related Art of the Invention

As for the conventional thermal storage apparatuses, for instance, there are the ones utilizing sensible heat of water such as a hot-water storage unit attached to an electric water heater and a compression-type heat pump hot-water supply apparatus, the ones utilizing the sensible heat of a solid such as a brick used for a thermal storage fan heater, and the ones utilizing latent heat utilizing phase change of a substance, and some of them are already put into practical use (for instance, refer to Chemical Industry Council "Thermal Storage Technology—Theory and Application thereof I," Sinzansha Sci-tech, Oct. 10, 1996, and also refer to Chemical Industry Council "Thermal Storage Technology—Theory and Application thereof II," Sinzansha Sci-tech, Aug. 30, 2001). The disclosure of Chemical Industry Council "Thermal Storage Technology—Theory and Application thereof I," Sinzansha Sci-tech, Oct. 10, 1996, and Chemical Industry Council "Thermal Storage Technology—Theory and Application thereof II," Sinzansha Sci-tech, Aug. 30, 2001 are incorporated herein by reference in their entireties.

As for chemical thermal storage using a reaction including a system of decomposition or separation into composition of two or more kinds, it uses reaction heat so as to obtain thermal storage density several to ten times larger compared to methods of the thermal storage using the sensible heat and latent heat (refer to Japanese Patent Laid-Open No. 5-172481 for instance and Japanese Patent Laid-Open No. 5-118593, and also refer to Chemical Industry Council "Thermal Storage Technology—Theory and Application thereof II," Sinzansha Sci-tech, Aug. 30, 2001). The disclosure of Japanese Patent Laid-Open No. 5-172481 and Japanese Patent Laid-Open No. 5-118593 are incorporated herein by reference in their entireties.

For instance, as for a chemical thermal storage method using an organic chemical reaction having a high thermal storage density, there is the one using a 2-propanol dehydrogenizing reaction (decomposition reaction) as shown in a chemical formula 1. Here, ΔH denotes variation in enthalpy.

[Chemical formula 1]

$(CH_3)_2CHOH\ (l)=(CH_3)_2CO\ (g)+H_2\ (g)\ \Delta H=100\ kJ/mol$ (Here, (l) denotes a liquid state, and (g) denotes a gaseous state)

As for the reaction of 2-propanol/acetone and hydrogen system, it is possible to perform thermal storage by using a rightward endothermic dehydrogenizing reaction of the chemical formula 1 and storing these products. According to the chemical formula 1, a thermal storage amount of water as a representative example of sensible-heat thermal storage is 4.2 kJ/kg, and that of sodium sulfate 10 hydrate as a representative example. of latent-heat thermal storage is 251 kJ/kg while that of the chemical thermal storage is 1,666 kJ/kg (745 kJ/kg in the case of acetone condensation).

FIG. 1 is a diagram showing temperature dependence of ΔH, TΔS and ΔG of a 2-propanol/acetone and hydrogen reaction. In a thermodynamic relational expression of a formula 3, the reaction shown in the chemical formula 1 is ΔG=0 at 150 degrees C. or so as shown in FIG. 1. To be more specific, the endothermic reaction does not progress in terms of balance at less than 150 degrees C., and progresses at temperature of 150 degrees C. or more. In general, is imposed and reaction products such as hydrogen are separated from this system so as to move the balance and thereby generate the endothermic reaction at 70 to 80 degrees C. or so.

[Formula 3]

$\Delta G = \Delta H - T\Delta S$

T: Thermal storage temperature
ΔS: Variation in entropy
ΔG. Variation in free energy Next, a description will be given as to the conventional thermal storage apparatus utilizing the 2-propanol/acetone and hydrogen system reaction shown in the chemical formula 1 by taking a chemical heat pump as an example.

FIG. 20 is a diagram showing the configuration of the conventional chemical heat pump listed in Japanese Patent Laid-Open No. 61-128071. The disclosure of Japanese Patent Laid-Open No. 61-128071 is incorporated herein by reference in their entireties.

In FIG. 20, reference numeral 201 denotes a dehydrogenation reaction apparatus of a shell-and-tube type heat exchange method of decomposing liquid isopropanol into gaseous acetone and hydrogen by using waste heat of about 80 degrees C. as a heat source. Reference numeral 202 denotes a distilling column of an internal multistage tray method of separating the gaseous acetone from the gaseous isopropanol accompanied by hydrogen in a gaseous substance generated in the dehydrogenation reaction apparatus 201. Reference numeral 204 denotes a hydrogenation reaction apparatus of the shell-and-tube type heat exchanger method of bringing in an unresponsive gas of the acetone and hydrogen from the distilling column 202 and generating heat at about 200 degrees C. by a hydrogenation reaction to return it to the gaseous isopropanol as a reaction product gas. Reference numeral 203 denotes a heat exchanger of an indirect contact method, provided between the distilling column 202 and the hydrogenation reaction apparatus 204, of heating the gaseous acetone and hydrogen flowing from the distilling column 202 to the hydrogenation reaction apparatus 204 with gas heat of the isopropanol gas and unresponsive acetone and hydrogen flowing from the hydrogenation reaction apparatus 204 to the distilling column 202 and increasing temperature. Reference numeral 205 denotes a steam drum. Reference numeral 206 denotes a waste heat fluid supply pipe. Reference numeral 207 denotes a waste heat fluid discharge pipe. Reference numeral 208 denotes piping. Reference numeral 209 denotes a liquid circulation pipe. Reference numeral 210 denotes a first water-supply pipe. Reference numeral 211 denotes a second water-supply pipe. Reference numeral 212 denotes a first steampipe. Reference numeral 213 denotes a second steam pipe.

And reference numeral 214 denotes a condenser of a shell-and-tube type heat exchanger method, provided on a dehydrogenation reaction side, of bringing in the gaseous acetone and hydrogen from the distilling column 202 and condensing the acetone to separate it from the hydrogen. Reference numeral 215 denotes a cooling water supply pipe to the condenser 214. Reference numeral 216 denotes the cooling water discharge pipe thereof. Reference numeral 217 denotes a flow regulating valve provided to the cooling water discharge pipe 216. Reference numeral 218 denotes a hydrogen gas line of supplying the hydrogen from the condenser 214 to a low-temperature side inlet of the heat exchanger 203. Reference numeral 219 denotes a condensate liquid storage tank. Reference numeral 220 denotes a condensate liquid line of connecting the tank 219 to the condenser 214. Reference numeral 221 denotes a separation column, provided on a hydrogenation reaction side, of bringing in the liquid acetone from the condensate liquid storage tank 219 and heating it with a reaction product substance and an unresponsive substance from a high-temperature side outlet of the heat exchanger 203 to gasify it. Reference numeral 222 denotes an acetone liquid first line connected to the tank 219. Reference numeral 223 denotes an acetone liquid second line connecting the acetone liquid first line 222 to an upper portion of the distilling column 202. Reference numeral 224 denotes an acetone liquid third line connecting the acetone liquid first line 222 to the upper portion of the separation column 221. Reference numeral 225 denotes a pump provided to the acetone liquid first line 222. Reference numeral 226 denotes the flow regulating valve provided to the acetone liquid second line 223. Reference numeral 227 denotes the flow regulating valve provided to the acetone liquid third line 224. Reference numeral 228 denotes a cooler of the shell-and-tube type heat exchanger method described later. Reference numeral 229 denotes the cooling water discharge pipe to the cooler 228. Reference numeral 230 denotes the cooling water discharge pipe thereof. Reference numeral 231 denotes a reboiler of the shell-and-tube type heat exchanger method described later. Reference numeral 232 denotes an acetone gas line connecting a top of the separation column 221 to a middle of the hydrogen gas line 218. Reference numeral 233 denotes a blower provided to the acetone gas line 232. Reference numeral 234 denotes a reaction product gas first line connected to the hydrogenation reaction apparatus 204. Reference numeral 235 denotes a reaction product gas second line connecting the line 234 to a high-temperature side inlet of the heat exchanger 203. Reference numeral 236 denotes a reaction product gas third line connecting the line 234 to the reboiler 231. Reference numeral 237 denotes a reaction product gas fourth line connecting the cooler 228 to the high-temperature side outlet of the heat exchanger 203. Reference numeral 238 denotes a reaction product gas fifth line connecting the reboiler 231 to the middle of the reaction product gas fourth line 237. Reference numeral 239 denotes the flow regulating valve provided to the reaction product gas fifth line 238. Reference numeral 240 denotes a liquid return line of supplying the condensate liquid condensed in the separation column 221 from its bottom to the center of the distilling column 202. Reference numeral 241 denotes the pump provided to the liquid return line 240. Reference numeral 242 denotes the flow regulating valve provided to the liquid return line 240. Reference numeral 243 denotes the flow regulating valve provided to the waste heat fluid discharge pipe 207. Reference numeral 244 denotes a pressure controller of detecting pressure of the distilling column 202 and controlling the valve 243. Reference-numeral 245 denotes a temperature controller of detecting a gas temperature of the hydrogen gas line 218 and controlling the valve 217. Reference numeral 246 denotes an unresponsive gas line connecting the hydrogenation reaction apparatus 204 to the low-temperature side outlet of the heat exchanger 203. Reference numeral 247 denotes the flow regulating valve provided to the unresponsive gas line 246. Reference numeral 248 denotes the pressure controller of detecting the pressure of the steam drum 205 and controlling the valve 247. Reference numeral 249 denotes the flow regulating valve provided to the first water-supply pipe 210. Reference numeral 250 denotes a liquid level controller of detecting a liquid level of the steam drum 205 and controlling the valve 249. Reference numeral 251 denotes a flow controller of inputting a detection signal from a detector 252 of detecting a flow rate of the liquid return line 240 and detecting the liquid level of the distilling column 202 to control the valve 242. Reference numeral 255 denotes the flow controller of detecting the flow rate of the acetone liquid third line 224 and controlling the valve 227. Reference numeral 254 denotes the liquid level controller of detecting the liquid level of the separation column 221 and controlling the valve 239. Reference numeral 255 denotes the liquid level controller of detecting the liquid level of the condensate liquid storage tank 219 and controlling the valve 226. Reference numeral 256 denotes a hydrogen gas holder. Reference numeral 257 denotes a hydrogen gas storage line provided branchlike from the hydrogen gas line 219 and connected to the holder 256. Reference numeral 258 denotes a compressor provided to the line 257. Reference numeral 259 denotes an opening and closing valve provided to the line 257. Reference numeral 260 denotes a hydrogen gas takeout line connecting the hydrogen gas storage line 257 between the holder 256 and the valve 259 to the hydrogen gas line 218. Reference numeral 261-denotes an acetone liquid storage tank. Reference numeral 262 denotes an acetone liquid storage line provided branchlike from the acetone liquid third line 224 and connected to the tank 261. Reference numeral 263 denotes the opening and closing valve provided to the line 262. Reference numeral 264 denotes an acetone liquid takeout line connecting the tank 261 to the line 224. Reference numeral 265 denotes the pump provided to the line 264. Reference numeral 266 denotes an isopropanol liquid storage tank. Reference numeral 267 denotes an isopropanol liquid storage line provided branchlike from a discharge side of the pump 241 of the liquid return line 240 and connected to the tank 266. Reference numeral 268 denotes the opening and closing valve provided to the line 267. Reference numeral 269 denotes an isopropanol liquid takeout line connecting the tank 266 to an intake side of the pump 241 of the liquid return line 240. Reference numeral 270 denotes the opening and closing valve provided to the line 269.

The chemical heat pump constituted as shown in FIG. 20 uses the isopropanol as a reacting substance to perform the endothermic reaction with the dehydrogenation reaction apparatus 201 by using the waste heat of about 80 degrees C. as the heat source and performs an exothermic reaction with the hydrogenation reaction apparatus 204 at about 20 degrees C.

To be more specific, a heat source fluid such as water or vapor having reached about 80 degrees C. due to factory waste heat, earth's heat or solar heat enters the dehydrogenation reaction apparatus 201 from the waste heat fluid supply pipe 206 so as to heat liquid isopropanol inside and be discharged from the waste heat fluid discharge pipe 207. A part of the liquid isopropanol heated to about 80 degrees C. in the dehydrogenation reaction apparatus 201 (boiling point of isopropanol is 82.4 degrees C. under atmospheric pressure) is decomposed into the gaseous acetone (boiling point of acetone is 56.2 degrees C. under atmospheric pressure) and gaseous hydrogen (boiling point of hydrogen is −252.7 degrees C. under atmospheric pressure), and turns to a gas-liquid mixed fluid and is led into the distilling column 202 by way of the piping 208 so that the gas rises.

Furthermore, the chemical heat pump shown in FIG. 20 has the condenser 214 of condensing the gaseous acetone and separating it from hydrogen, the separation column 221 of gasifying the condensed acetone, the hydrogen gas holder 256, the acetone liquid storage tank 261, the isopropanol liquid storage tank 266 and so on. Therefore, transport and storage of the substances between the dehydrogenation reaction side and the hydrogenation reaction side are performed in a gaseous state as to the hydrogen, and are performed in a liquid state as to the acetone and isopropanol.

To be more specific, to describe the devices, the condenser 214 brings in the gaseous acetone and hydrogen generated in the distilling column 202 and cools them to condense the acetone. The hydrogen separated here is sent to the low-temperature side inlet of the heat exchanger 203 by way of the hydrogen gas line 218. The acetone condensed in the condenser 214 leads to the condensate liquid storage tank 219 by way of the condensate liquid line 220. And it further flows in the acetone liquid first line 222 by means of the pump 225 so that a part of it is supplied to the upper portion of the distilling column 202 by way of the acetone liquid second line 225 while the other part is supplied to the upper portion of the separation column 221 by way of the acetone liquid third line 224.

In the distilling column 202, the acetone liquid having fallen from above as supplied from the acetone liquid second line 223 directly contacts the gaseous isopropanol, acetone and hydrogen generated in the dehydrogenation reaction apparatus 201 and led into the distilling column 202. The liquid acetone evaporates and joins the gaseous acetone and hydrogen, and the accompanying gaseous isopropanol gets condensed and leads to the column bottom.

The cooler 228 cools the isopropanol which is a reaction product gas and the acetone and hydrogen which are the unresponsive gases from the high-temperature side outlet of the heat exchanger 203 so that a part of the isopropanol gets condensed and the other part is supplied as a gaseous fluid to the central portion of the separation column 221.

In the separation column 221, the acetone liquid having fallen from above as supplied from the acetone liquid third line 224 directly contacts the fluid supplied from the cooler 228. The liquid acetone evaporates, and of the fluids supplied from the cooler 229, only isopropanol gets condensed and leads to the column bottom, and the others join the hydrogen of the hydrogen gas line 218 and is supplied to the low-temperature side inlet of the heat exchanger 203 by means of the blower 233.

The reboiler 231 provides to the separation column 221 a heat quantity insufficient to evaporate the entire quantity of the acetone liquid having fallen in the separation column 221. To be more specific, the reboiler 231 is provided in order to supplement and adjust the heat quantity insufficient in the separation column 221.

The pump 241 pressure-feeds the liquid isopropanol retained at the bottom of the separation column 221 to the distilling column 202.

In the case where the hydrogen generated in the condenser 214 is redundant, the hydrogen gas holder 256 closes the opening and closing valve (not shown) provided to the hydrogen gas takeout line 260, and opens the opening and closing valve 259 of the hydrogen gas storage line 257 to operate the compressor 258 so as to inject and store the redundant hydrogen. Inversely, in the case where it is insufficient, it closes the opening and closing valve 259 and stops the compressor 258, and opens the opening and closing valve of the hydrogen gas takeout line 260 so as to supply the stored hydrogen from the hydrogen gas takeout line 260 to the hydrogen gas line 218. In the case of a steady operation with no excess or deficiency of the hydrogen, the compressor 258 is stopped, and both the valves of the opening and closing valve 259 and the hydrogen gas takeout line 260 are closed.

In the case where the acetone liquid generated in the condenser 214 and stored in the condensate liquid storage tank 219 is redundant, the acetone liquid storage tank 261 opens the opening and closing valve 263, and stores the redundant portion of the acetone liquid flowing in the acetone liquid third line 224 by means of the pump 225. Inversely, in the case where it is insufficient, it closes the opening and closing valve 263, and operates the pump 265 to supply the stored acetone liquid from the acetone liquid takeout line 264 to the acetone liquid third line 224. In the case of the steady operation with no excess or deficiency of the acetone, the opening and closing valve 263 is closed and the pump 265 is stopped.

In the case where the isopropanol liquid generated in the separation column 221 is redundant, the isopropanol liquid storage tank 266 opens the opening and closing valve 268 and closes the opening and closing valve 270, and stores the redundant isopropanol liquid flowing in the liquid return line 240 by way of the isopropanol liquid storage line 267 by means of a discharge force of the pump 241. Inversely, in the case where it is insufficient, it closes the opening and closing valve 268 and opens the opening and closing valve 270 so as to have the stored isopropanol liquid absorbed into the pump 241 from the isopropanol liquid takeout line 269. In the case of the steady operation with no excess or deficiency of the isopropanol liquid, the opening and closing valves 268 and 270 are closed.

Therefore, as for the chemical heat pump shown in FIG. 20, the hydrogenation reaction apparatus 204 has the gaseous acetone and hydrogen supplied from the unresponsive gas line 246, and a predetermined hydrogenation reaction is performed. And in the case where excess or deficiency arises as to the unresponsive substances and reacting substances, an adjustment can be made as to the storage and release in the hydrogen gas holder 256, the acetone liquid storage tank 261 and the isopropanol liquid storage tank 266 respectively.

Thus, the chemical heat pump to which the isopropanol is the reacting substance comprises the condenser of bringing in and cooling the gaseous acetone and hydrogen from the distilling column and condensing the acetone to separate it from the hydrogen and the separation column of bringing in the liquid acetone generated in the condenser and heating it with the reaction product substance and unresponsive substance from the high-temperature side of the heat exchanger to gasify it. And both of the hydrogen separated by the condenser and the gaseous acetone generated in the separation column are sent to the low-temperature side inlet of the heat exchanger. Therefore, there is no interference with the heat exchange by the heat exchanger and the hydrogenation reaction by the hydrogenation reaction apparatus, and they will be performed as predetermined. In addition, it has the hydrogen gas holder of temporarily having a hydrogen gas flow in to be stored and then flow out between it and hydrogenation gas line connecting the condenser to the low-temperature side inlet of the heat exchanger, the acetone liquid tank of temporarily having the liquid acetone flow in to be stored and then flow out between it and an acetone liquid line of supplying the liquid acetone to the separation column, and the isopropanol liquid storage tank of temporarily having the liquid acetone flow in to be stored and then flow out between it and the liquid return line of supplying the condensate isopropanol from the separation column to the distilling column. Therefore, in the case where excess or deficiency arises as to the unresponsive substances and reacting substances, it is possible to store and release the hydrogen, acetone and isopropanol respectively. Thus, it is possible, in a relationship between a waste heat side and a heat use side, to store the heat in the case where the heat of a waste heat source is redundant and release the stored heat in the case where it is insufficient so as to constantly make rational use of the waste heat.

As for a hot-water storage tank used for an electric water heater and a compression-type heat pump hot-water supply apparatus, installation space thereof is a serious factor in blocking its diffusion in view of housing complexes and urban housing situation so that further miniaturization of a thermal storage tank is demanded.

However, in the case of applying a chemical thermal storage method using a system using an inorganic chemical reaction capable of operating at low temperature of a room temperature level or hydrogen absorbing alloys to a use which needs to efficiently store low-temperature heat of less than 100 degrees C. such as the above hot-water storage tank, it is not possible to store thermal energy at a sufficiently high density.

In the case of using the organic chemical reaction shown in the chemical formula 1, for instance, it is possible to obtain a relatively large thermal storage amount so as to obtain a high thermal storage density by storing hydrogen, acetone and so on. As for domestic heat storage, however, it is necessary to store heat quantity as low as possible such as less than 70 degrees C., and it is difficult to absorb and store effectively the heat of such a low temperature level by using the chemical reaction exemplified by the above chemical formula 1. To be more specific, it is necessary to have the reaction progress at further low temperature for the sake of storing the heat of a domestic hot water supply level at a high density.

In consideration of the problems of the thermal storage method, an object of the present invention is to provide the thermal storage method, thermal storage apparatus and heat source system capable of storing the heat of the domestic hot water supply level at the high density.

SUMMARY OF THE INVENTION

To attain the object, the $1^{st}$ aspect of the present invention is a thermal storage method wherein, if thermal storage temperature is T, variation in enthalpy in a chemical reaction is $\Delta H$, variation in entropy is $\Delta S$, and variation in free energy is $\Delta G$, a thermal storage material satisfying a relationship of
[Formula 2]

$$T\Delta S \geq \Delta G$$

is used under a condition of
[Formula 1]

$$\Delta H > 0$$

so as to promote a reaction for changing thermal storage material into thermal storage material in an energy storing state by adding supplemental energy when changing said thermal storage material into said thermal storage material in the energy storing state by decomposing or separating said thermal storage material.

The $2^{nd}$ aspect of the present invention is the thermal storage method according to the $1^{st}$ aspect of the present invention, wherein said supplemental energy is electricity, and to promote the reaction for changing said thermal storage material into said thermal storage material in the energy storing state by adding the supplemental energy is to promote the reaction for changing said thermal storage material into said thermal storage material in the energy storing state by providing a potential difference.

The $3^{rd}$ aspect of the present invention is the thermal storage method according to the $1^{st}$ aspect of the present invention, wherein said supplemental energy is light, and to promote the reaction for changing said thermal storage material into said thermal storage material in the energy storing state by adding the supplemental energy is to promote the reaction for changing said thermal storage material into said thermal storage material in the energy storing state by a photocatalytic reaction.

The $4^{th}$ aspect of the present invention is the thermal storage method according to the $2^{nd}$ aspect of the present invention, wherein said thermal storage material and said thermal storage material in the energy storing state include a substance condensable or a substance storable by absorption and convertible to an ion-conducting substance.

The $5^{th}$ aspect of the present invention is the thermal storage method according to the $4^{th}$ aspect of the present invention, wherein said ion-conducting substance is proton.

The $6^{th}$ aspect of the present invention is the thermal storage method according to the $2^{nd}$ aspect of the present invention, wherein said thermal storage material includes a substance for absorbing heat by a dehydrogenating reaction of O—H coupling and C—H coupling.

The $7^{th}$ aspect of the present invention is a thermal storage apparatus using the thermal storage method according to the $1^{st}$ aspect of the present invention, comprising:

a heat source;

a supplemental energy supply portion of adding said supplemental energy;

a thermal storage reaction portion of changing said thermal storage material into said thermal storage material in the energy storing state by decomposing or separating said thermal storage material with heat from said heat source and said supplemental energy from said supplemental energy supply portion;

an energy storing thermal storage material storage portion of storing said thermal storage material in the energy storing state;

exothermic reaction portion of coupling said thermal storage material in the energy storing state; and a heated fluid passage of receiving heat from said exothermic reaction portion.

The $8^{th}$ aspect of the present invention is the thermal storage apparatus according to the $7^{th}$ aspect of the present invention, further comprising:

a heating fluid passage, having a part of it placed in said thermal storage reaction portion, of heating said thermal storage reaction portion with a heating fluid circulating inside it;

a thermal storage material storage portion of storing said thermal storage material, wherein said heat source is said heating fluid passage; and said heating fluid passage contacts with said thermal storage material storage portion more upstream side than said thermal storage reaction portion so as to heat said thermal storage material storage portion.

The $9^{th}$ aspect of the present invention is the thermal storage apparatus according to the $7^{th}$ aspect of the present invention, comprising a heat exchanger between said energy storing thermal storage material storage portion and said thermal storage reaction portion or in said energy storing thermal storage material storage portion, wherein said heat source is said heat exchanger; and said heat exchanger recovers the heat of said thermal storage material in the energy storing state and heats said thermal storage material with said recovered heat.

The 10$^{th}$ aspect of the present invention is the thermal storage apparatus according to the 7$^{th}$ aspect of the present invention, comprising a supplemental energy control portion of adjusting an amount of said supplemental energy correspondingly to change in temperature of said thermal storage reaction portion.

The 11$^{th}$ aspect of the present invention is the thermal storage apparatus according to the 7$^{th}$ aspect of the present invention, wherein said supplemental energy is electricity;

said thermal storage reaction portion has electrodes and an electrolyte;

said supplemental energy supply portion adds a potential difference between said electrodes; and said thermal storage reaction portion promotes said decomposition or separation reaction with said added potential difference.

The 12$^{th}$ aspect of the present invention is the thermal storage apparatus according to the 11$^{th}$ aspect of the present invention, wherein said exothermic reaction portion has an electrode portion with a first electrode and a second electrode placed on both sides of the electrolyte and electric terminals connected to said first electrode and said second electrode, supplies at least one kind of said thermal storage material in the energy storing state to said first electrode and supplies other thermal storage material in the energy storing state to said second electrode, so that said thermal storage material in the energy storing state supplied to said first electrode is ionized and moves to said second electrode by way of said electrolyte to cause said electric terminals to generate electricity, and heated fluid of said heated fluid passage is heated by the heat generated on generating the thermal storage material on said second electrode.

The 13$^{th}$ aspect of the present invention is the thermal storage apparatus according to the 12$^{th}$ aspect of the present invention, wherein said exothermic reaction portion doubles as said thermal storage reaction portion, and said apparatus comprises switching means of switching said electric terminals so that said electric terminals are connected (1) to said supplemental energy supply portion when separating or decomposing said thermal storage material in said exothermic reaction portion and (2) to the electric terminals for taking out electricity when coupling said thermal storage material in the energy storing state in said exothermic reaction portion respectively.

The 14$^{th}$ aspect of the present invention is the thermal storage apparatus according to the 12$^{th}$ aspect of the present invention, further comprising electricity storage means, connected to said electric terminals, of storing electricity generated on said electric terminals, and said electricity storage means supplies the electricity to said thermal storage reaction portion via said supplemental energy supply portion so as to promote decomposition or separation of said thermal storage material.

The 15$^{th}$ aspect of the present invention is the thermal storage apparatus according to the 14$^{th}$ aspect of the present invention, further comprising thermal storage reaction portion heating means of heating said thermal storage reaction portion by having the electricity supplied from said electricity. storage means on decomposing or separating said thermal storage material.

The 16$^{th}$ aspect of the present invention is the thermal storage apparatus according to the 12$^{th}$ aspect of the present invention, further comprising electric heat conversion means connected to said electric terminals and placed to thermally contact said heated fluid passage, and wherein said electric heat conversion means converts the electricity generated on generating coupling of said thermal storage material in the energy storing state into heat so as to heat said heated fluid passage.

The 17$^{th}$ the aspect of the present invention is the thermal storage apparatus according to the 12$^{th}$ aspect of the present invention, further comprising electric heat conversion means connected to said electric terminals and placed to thermally contact said energy storing thermal storage material storage portion, and wherein said electric heat conversion means converts the electricity generated on generating coupling of said thermal storage material in the energy storing state into heat so as to heat said energy storing thermal storage material storage portion.

The 18$^{th}$ aspect of the present invention is a heat source system, further comprising the thermal storage apparatus according to the 16$^{th}$ or the 17$^{th}$ aspects of the present invention, wherein said electric heat conversion means is a heat pump; and said heat pump generates heat and cold from the electricity generated on generating coupling of said thermal storage material in the energy storing state, heats said heated fluid passage and/or said energy storing thermal storage material storage portion with said heat, and cools said energy storing thermal storage material storage portion with the cold.

The 19$^{th}$ aspect of the present invention is a thermal storage method, comprising:

a thermal storage reaction step of generating a thermal storage material in an energy storing state by decomposing or separating a thermal storage material on a thermal storage reaction and heating said thermal storage material generating a reaction of said decomposition or separation and coupling so as to generate said decomposition or separation; and an exothermic reaction step of coupling said thermal storage material in the energy storing state generated by said decomposition or separation, and said exothermic reaction step supplies at least one kind of said thermal storage material in the energy storing state to a first electrode and supplies other said thermal storage material in the energy storing state to a second electrode of an exothermic reaction portion having an electrode portion with said first electrode and said second electrode placed on both sides of the electrolyte, so that a further decomposed and ionized portion of said thermal storage material in the energy storing state moves to said second electrode side by way of the inside of said electrolyte film to cause electricity to be generated between said first electrode and said second electrode and generate said thermal storage material on said second electrode so as to generate heat.

The 20$^{th}$ aspect of the present invention is the thermal storage apparatus according to the 7$^{th}$ aspect of the present invention, wherein the supplemental energy is light;

said thermal storage reaction portion has a light exposure surface; and said supplemental energy supply portion supplies the light to said light exposure surface so as to promote the decomposition or separation.

A thermal storage apparatus using a chemical thermal storage method and a heat source system using the same according to the present invention will be described hereafter.

The 2-propanol on the left of the chemical formula 1 is an example of the thermal storage material, and the acetone and hydrogen as decomposition products on the right side of the 2-propanol are an example of the thermal storage material in the energy storing state. Likewise, as regards the system decomposed or separated into two or more kinds of composition in the system for ΔH used for the thermal storage, it is the thermal storage material before the decomposition or separation, and it is the thermal storage material in the energy storing state after the decomposition or separation.

The thermal storage apparatus according to the present invention is intended to utilize at lower temperature the chemical thermal storage using endothermic and exothermic actions in conjunction with the decomposition of the substance or separation into two or more kinds of composition. And the supplemental energy especially such as electrical energy or light is added as ΔG of the chemical formula 1 shown in FIG. 1 so as to sufficiently promote the decomposition or separation which is thermodynamically difficult at low temperature under normal circumstances and store the energy in total centering on thermal energy.

Here, in the case of storing the heat quantity of the heat pump and so on by using an infrastructure such as electricity as the supplemental energy, a consumed quantity of the supplemental energy should preferably be as small as possible so as not to reduce a coefficient of performance of the heat pump in total as much as possible. Therefore, if thermal storage temperature is T, variation in enthalpy in a chemical reaction is ΔH, variation in entropy is ΔS, and variation in free energy is ΔG, it needs to be a reaction system in which ΔG is smaller than TΔS (formula 2) under the condition of the formula 1 (endothermic reaction) at the thermal storage temperature T. Thus, it needs to be the reaction system in which ΔG is smaller than TΔS under the condition of ΔH>0 (endothermic reaction) at the objective thermal storage temperature T.

[Formula 1]

$$\Delta H > 0$$

[Formula 2]

$$T\Delta S \geqq \Delta G$$

To easily cause a reverse reaction (exothermic reaction) on taking out the heat, it should preferably be ΔG≧0. Here, the thermal storage temperature T is basically intended as a domestic hot water level of up to 100 degrees C. or so of the room temperature, and it is desirable to store the heat up to the room temperature. However, it is possible, as a matter of course, to use it at the temperature lower or higher than this.

FIG. 2 shows temperature dependence of ΔH, TΔS and ΔG in the reaction for generating hydrogen and oxygen by electrolysis of water. As shown in FIG. 2, it is ΔH>0 in the range of 0 to 500 degrees C., but ΔG is larger than TΔS so that it is not suited to the thermal storage apparatus intended to store the heat. To be more specific, as a large quantity of electric energy is necessary for the thermal storage, there is a problem that necessary equipment and electricity expense increase and lead to high costs, and efficiency loss occurs due to resistance in the case of recovering. it as electricity on heat generation. Therefore, in the case where the object is the thermal storage, it is desirable, as to the reaction system to be used, to satisfy the relationship in the formula 2 and have ΔG as little as possible. For instance, taking the electrolysis of water as an example, it is necessary to devote the quantity of the electrical energy 4.5 times as much as that of the heat as ΔG, and handling and loss of the electricity simultaneously coming in and out become significant in the case where the object is the thermal storage. In the case of chemical formula 1, the quantity of the electrical energy half as much as that of the heat suffices, and so manageability and efficiency as the thermal storage are excellent. As for other systems, they must satisfy at least the formulas 1 and 2 likewise in the case where the object is the thermal storage.

In the case of promoting the reaction of the chemical formula 1 by the electrolysis, it is possible to promote a started reaction with the heat from the fluid passage by partially adding a potential of ΔG to a thermal storage reaction portion comprised of the electrodes and electrolyte and supplying the electrical energy. For instance, if a formula 3 is an electrode reaction, it will be a chemical formula 2 on an anode side and a chemical formula 3 on a cathode side.

[Chemical formula 2]

$$(CH_3)_2CHOH \rightarrow (CH_3)_2CO + 2H^+ + 2e^-$$

[Chemical Formula 3]

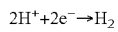

$$2H^+ + 2e^- \rightarrow H_2$$

To implement the above reaction as an apparatus, a solid electrolyte is suited to the electrolyte used for the electrode reaction. As an intended temperature zone for use is low, it is desirable to use a proton-conducting solid electrolyte such as a cation exchange substance like perfluorosulfone acid polymer used for a solid polymer type fuel cell and so on rather than the solid electrolyte using an oxygen ion or cationic conduction. As water is necessary for a cation exchange membrane to filter out hydrogen, it is desirable to provide means of supplying water to a reactive medium such as a humidification unit according to the electrolyte to be used.

Therefore, based on the principle of the formula 3, the reaction system used by the present invention must be the one such as hydrogen, which ion-conducts in the electrolyte by being dissociated and is not poisoning to the electrodes and electrolyte.

And so the one such hydrogen which ion-conducts in the electrolyte by being dissociated and is not poisoning to the electrodes and electrolyte should be selected as the reaction system to be used by the present invention. The reaction system usable from such a viewpoint may be the organic chemical reaction accompanied by a dehydrogenation to hydrogenation reaction, a desorption to dissociation endothermic reaction of the hydrogen by the hydrogen absorbing alloys and so on. From a viewpoint of storability, the substance related to the above reversible reaction system should preferably be condensable or easily storable by physical absorption, chemical absorption and so on.

In the case of using the organic chemical reaction in particular, it has fluidity since the reaction may be a liquid or a gas. Thus, it is possible, on performing the endothermic reaction or exothermic reaction, to control supply and thereby control a sensible heat amount of the reaction so as to easily obtain a prompt exothermic reaction of the apparatus.

As for the reaction systems used for such an organic chemical reaction, the ones involving organic matters having OH and CH couplings for undergoing a dehydrogenating action are preferable for the present invention. Alcohol/ketone (aldehyde) and hydrogen system, saturated hydrocarbon/aromatic hydrocarbon and hydrogen system and so on are representative examples thereof.

Table 1 shows ΔH, TΔS, ΔG and an equilibrium coefficient K at 25 degrees C. of a representative reaction system. The equilibrium coefficient K is represented by K=exp (−ΔG/RT) (R is a gas coefficient equivalent to 8.31 J/Kmol).

TABLE 1

| No. | Reaction formula | T (° C.) | $\Delta$H(kJ) | $\Delta$S(J) | $\Delta$G(kJ) | T$\Delta$S(kJ) | K |
|---|---|---|---|---|---|---|---|
| 1 | $(CH_3)_2CHOH(l) = (CH_3)_2CO(g) + H_2(g)$ | 25 | 100.533 | 244.618 | 27.6 | 72.89616 | 1.46E−05 |
| 2 | $(CH_3)_2CHOH(l) = (CH_3)_2CO(g) + H_2(g)$ | 25 | 69.99 | 149.992 | 25.27 | 44.69762 | 3.74E−05 |
| 3 | $cis\text{-}C_{10}H_{18}(l) = C_{10}H_8(l) + 5H_2(g)$ | 25 | 316.34 | 608.266 | 134.985 | 181.2633 | 2.23E−24 |
| 4 | $CH_3OH(l) = CH_2O(g) + H_2(g)$ | 25 | 122.671 | 222.668 | 56.282 | 66.35506 | 1.38E−10 |
| 5 | $CH_3CH_2OH(l) = CH_3CHO(g) + H_2(g)$ | 25 | 110.625 | 234.342 | 40.756 | 69.83392 | 7.23E−08 |
| 6 | $CH_3OH(l) + H_2O(l) = CO_2(g) + 3H_2(g)$ | 25 | 130.896 | 409.082 | 8.929 | 121.9064 | 2.73E−02 |
| 7 | $CHOOCH_3(g) = 2CO(g) + 2H_2(g)$ | 25 | 128.955 | 355.607 | 22.931 | 105.9709 | 9.60E−05 |
| 8 | $CH_3COOH(l) = 2CO(g) + 2H_2(g)$ | 25 | 263.006 | 496.85 | 114.87 | 148.0613 | 7.47E−21 |
| 9 | $C_6H_{12}(l) = C_6H_6(l) + 3H_2(g)$ | 25 | 195.33 | 324.185 | 98.674 | 96.60713 | 5.14E−18 |
| 10 | $2H_2O(l) = O_2(g) + 2H_2(g)$ | 25 | 571.66 | 326.607 | 474.282 | 97.32889 | 7.96E−84 |
| 11 | $CO(g) + H_2O(l) = CO_2(g) + H_2(g)$ | 25 | 2.866 | 76.839 | −20.044 | 22.89802 | 3.25E+03 |
| 12 | $H_2S(g) = S(g) + H_2(g)$ | 25 | 20.502 | −43.016 | 33.327 | −12.8188 | 1.45E−06 |
| 13 | $2CH_3SH(g) + (CH_3)_2S_2(g) + H_2(g)$ | 25 | 17.958 | −49.43 | 32.695 | −14.7301 | 1.87E−06 |
| 14 | $CH_4(g) + O_2(g) = CO_2(g) + 2H_2(g)$ | 25 | −318.633 | 83.768 | −343.608 | 24.96286 | 1.60E+60 |
| 15 | $CO_2(g) + 2H_2O(l) = CH_4(g) + 2O_2(g)$ | 25 | 890.292 | 242.839 | 817.89 | 72.366 | 2.01E+143 |
| 16 | $CH_4(g) + 2H_2O(l) = CO_2(g) + 4H_2(g)$ | 25 | 253.027 | 410.375 | 130.674 | 122.2918 | 1.27E−23 |
| 17 | $MgH_2 = Mg + H_2(g)$ | 25 | 76.149 | 132.269 | 36.713 | 39.41616 | 3.69E−07 |

In Table 1, the substances suited to use conditions of the present invention are organic reactions of Nos. 1 to 8 and the hydrogen absorbing alloy system of No. 17 for instance. As for the thermal storage, it is necessary to store the substances, and so the reaction systems should preferably be easily condensable or capable of an absorption reaction separately. As hydrogen can be stored by the hydrogen absorbing alloys, the reaction systems of Nos. 1 to 5 and 17 are particularly preferable. The other Nos. 8 to 16 are the examples of becoming $\Delta G > T\Delta S$ under the condition of the formula 1, and are not suited in the case where the object is the thermal storage as with the water of No. 10.

As for a light reaction, the reaction can be promoted at low temperature by applying a photocatalyst to a dehydrogenizing reaction catalyst as in the case of applying the potential. In this case, it is possible to use an artificial light source, sunlight and so on as a supplemental energy supply portion. Here, in the case of using the artificial light source, it is loss as the heat except the portion utilized as the light in particular, it is desirable to recover and use the heat.

According to the present invention, it is possible to generate the electricity by having the exothermic reaction performed via an electrode portion on heat generation reaction. The present invention is characterized by storing the electricity generated here and using it for an electrical or thermal input of the thermal storage reaction portion again or using electric heat conversion means provided separately to convert it to the thermal energy so as to improve thermal storage efficiency including usability by utilizing it together with the thermal storage on heat generation or effectively exploiting it as a heat source for air conditioning and heating. It is also possible to utilize the generated electricity and convert it to cold by using the above electric heat conversion means for instance, it becomes possible to supply the heat in the form of a refrigerator or basic air conditioning to meet a domestic heat demand ratio. It is also feasible to use the heat pump as the electric heat conversion means so as to take out and appropriately use both the heat and cold.

In the case of the reaction for generating hydrogen and oxygen by the electrolysis of water, the above electricity generated on radiation is a large quantity so that, in the case of storing it, large storage equipment is separately required.

According to the present invention, it is possible to provide the thermal storage method and thermal storage apparatus by the chemical thermal storage method capable of storing the heat of the domestic hot water supply level at a higher density. It is also possible to provide the thermal storage apparatus, thermal storage method and heat source system capable of generating the electricity on radiation and effectively utilizing the generated electricity.

BRIEF DESCRIPTION OF THE DRAWINGS

FIGS. 14(A) and (B) is a schematic view of the thermal storage apparatus according to a fourth embodiment of the present invention.

DESCRIPTION OF SYMBOLS

Figure 1:
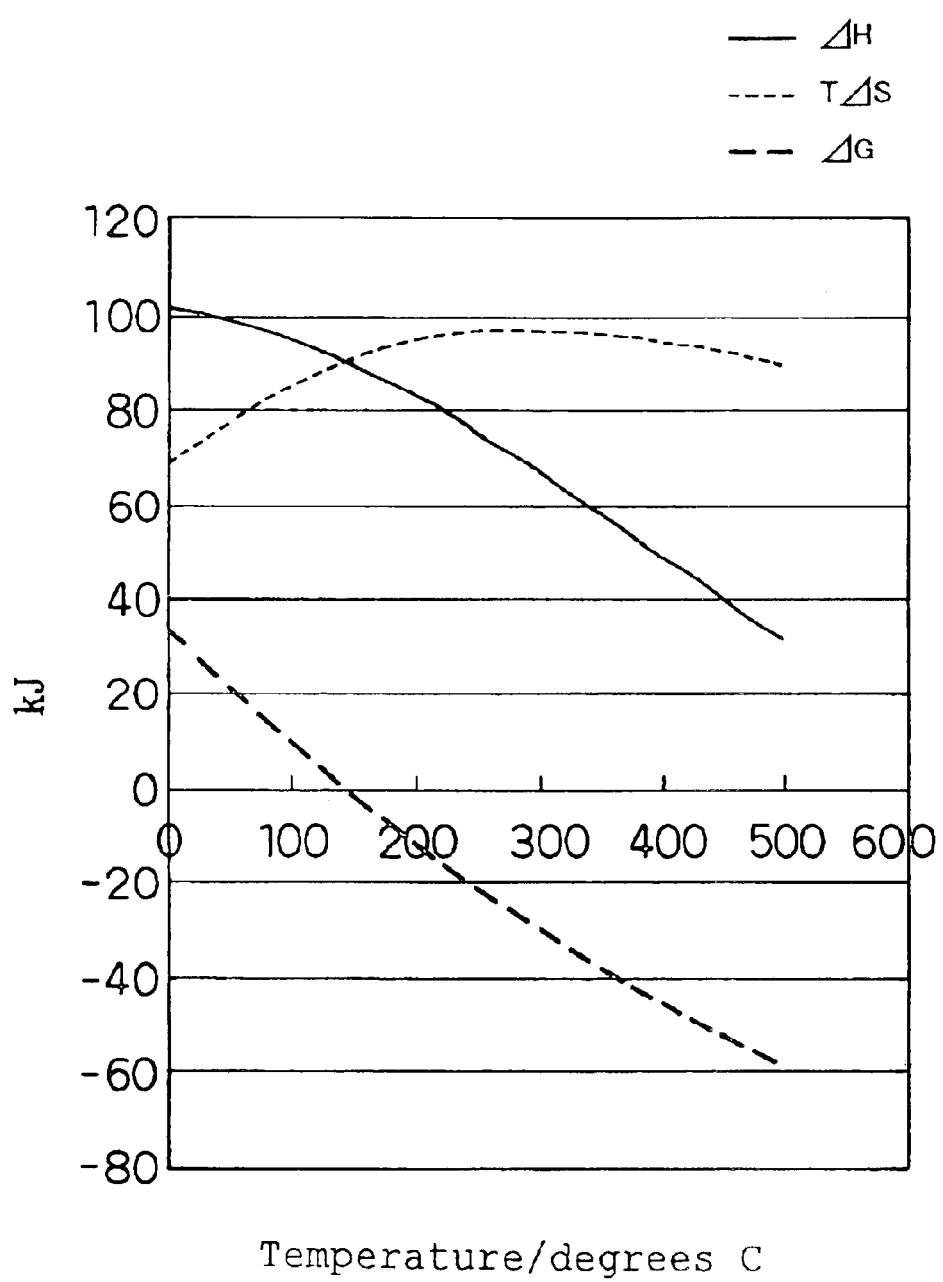
FIG. 1 is a diagram for describing the principle of the present invention, showing temperature dependence of $\Delta H$, T$\Delta S$ and $\Delta G$ of a 2-propanol/acetone and hydrogen reaction.
Figure 2:
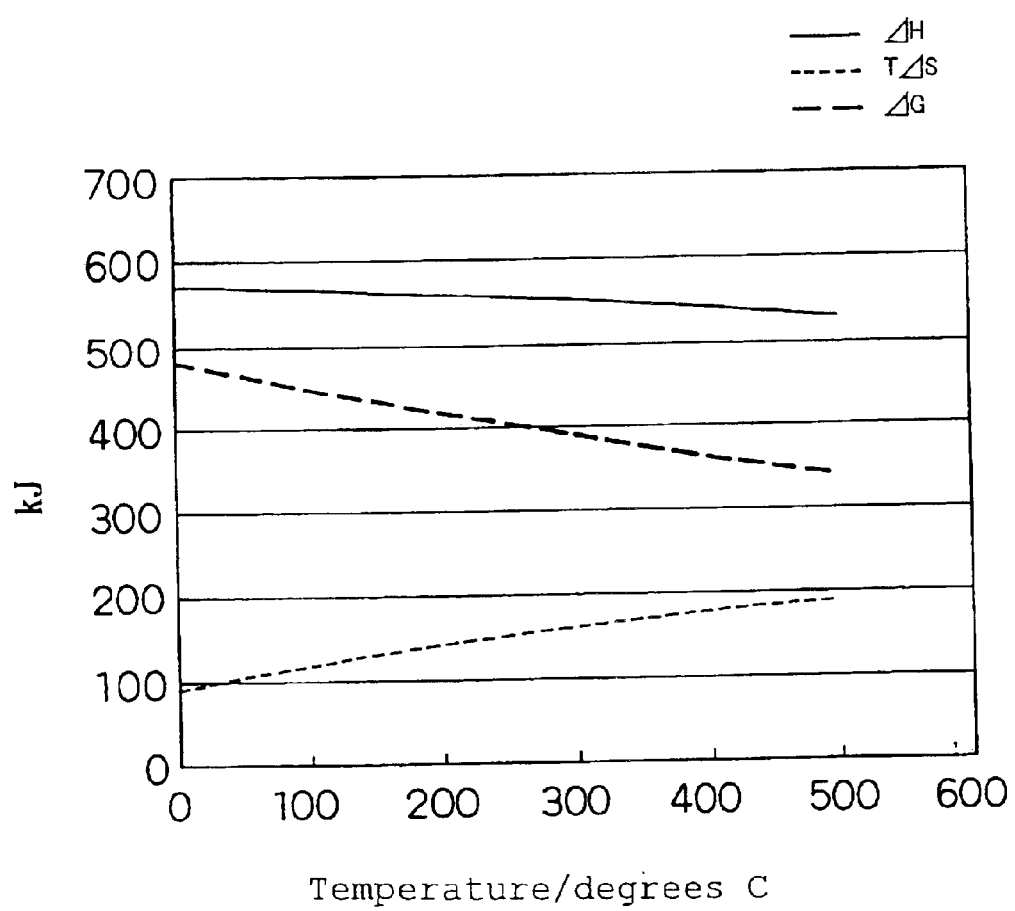
FIG. 2 is a diagram for describing the principle of the present invention, showing the temperature dependence of $\Delta H$, T$\Delta S$ and $\Delta G$ in a decomposition reaction of water.

1 Thermal storage material tank
2 Valve
3 Pump
4 Thermal storage material supply port
5 Thermal storage reaction portion
6 Collector A
7 Collector B
8 Energy storing thermal storage material tank A
9 Energy storing thermal storage material tank B
10 Fluid passage
11 Heat exchanger
12 Electrode with a catalyst
13 Solid electrolyte
14 Electrode portion
15 Separator
16 Water supply portion
17 Drainage portion
20 Power supply and control portion
21 Valve
22 Valve
23 Heated fluid passage
24 Mixer
25 Heat exchanger+catalyst
26 Exothermic reaction portion
27 Valve
28 Light exposure portion
29 Power supply+control portion
30 Heat exchanger+photocatalyst
31 Separation portion
32 Valve
33 Energy storing thermal storage material outlet
34 Reaction chamber
35 Thermal storage material tank
36 55, 56, 62 Valves
37 Pump
38 Thermal storage material supply port
39 Thermal storage reaction portion
40 Collector A
41 Collector B
42 Energy storing thermal storage material tank A
43 Energy storing thermal storage material tank B
44 Fluid passage
45, 61, 63 Heat exchangers
46, 96, 106 First electrodes
47, 97, 107 Solid electrolytes
48, 98, 108 Second electrodes
49, 59, 109 Electrode portions
50 Separator
51, 77, 94 Water supply portions
52, 78, 95 Drainage portions
54 Power supply and control portion
57 Heated fluid passage
58 Thermal storage material collector
60 Exothermic reaction portion
64 Electric terminal
65 Electricity storage portion
66 Insulating means
67 Reaction portion
68 Electric heat conversion portion
69 Evaporator
70 Expansion valve
71 Compressor
72 Condenser
73 Cold storage portion
75 Heat transmission means
76 Switch
79 Cooling medium passage
80 Energy storing thermal storage material supply portion A
81 Energy storing thermal storage material supply portion B
82 Heat transmission means
99 Heat pump

PREFERRED EMBODIMENTS OF THE INVENTION

Hereafter, embodiments of the present invention will be described by referring to the drawings.

(First Embodiment)

Figure 3:
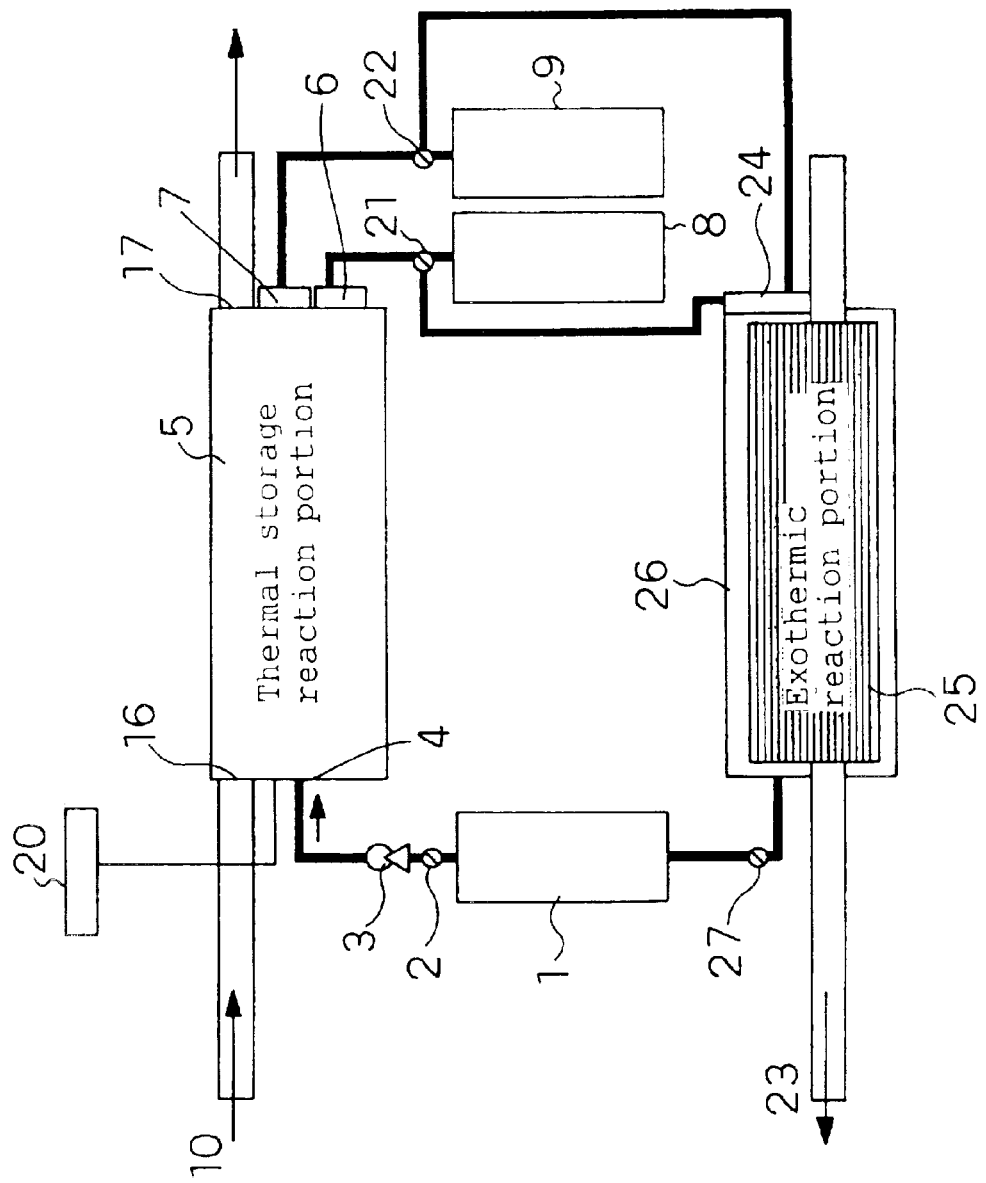
FIG. 3 is a schematic view of a thermal storage apparatus according to a first embodiment of the present invention.

FIG. 3 shows a block diagram of a thermal storage apparatus according to a first embodiment characterized by supplying electrical energy as supplemental energy by using a thermal rage method of the present invention. A description will given, based on FIG. 3, as to a configuration and an operation the case of utilizing relationships in the formula 3 and the chemical formulas 2 and 3, and a description will be given based on 2-propanol/acetone (1)+hydrogen system (thermal storage density: 745 kJ/kg) of No. 2 in Table 1.

A valve 2 opens, and the 2-propanol which is the thermal storage material from a thermal storage material tank 1 is supplied by a pump 3 to the inside of a thermal storage reaction portion 5 from a thermal storage material supply port 4. In the thermal storage reaction portion 5, the 2-propanol is decomposed (dehydrogenizing reaction) and converted to acetone and hydrogen by heat of a fluid passage 10 and the electrical energy supplementally supplied from a power supply and control portion 20 separately so as to have the heat of the fluid passage 10 absorbed by endothermy at that time. The acetone and hydrogen as the thermal storage material in an energy storing state are collected by a collector A denoted by a reference numeral 6 and collector B denoted by a reference numeral 7, and are stored in an energy storing thermal storage material tank A denoted by a reference numeral 8 and an energy storing thermal storage material tank B denoted by a reference numeral 9 respectively.

Figure 4:
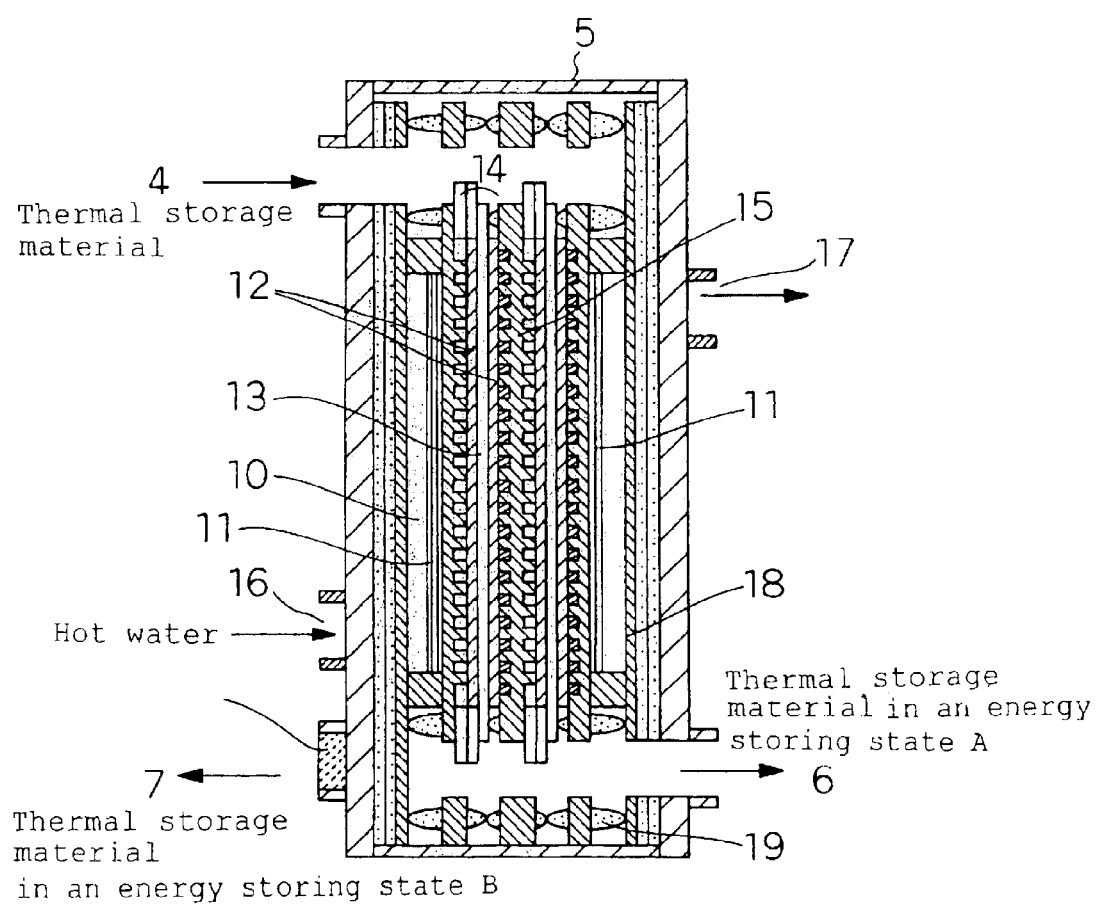
FIG. 4 is a schematic view of a thermal storage reaction portion of the thermal storage apparatus according to the first embodiment of the present invention.

Here, FIG. 4 shows a schematic view of the inside of the thermal storage reaction portion 5. Inside the thermal storage reaction portion 5, an electrode portion 14 thermally contacts the fluid passage 10 via a heat exchanger 11. And the electrode portion 14 is comprised of an electrode with a catalyst 12 and a solid electrolyte 3. The electrode portion 14 is also laminated into a plurality via a separator 15, where each laminated portion simultaneously contributes to decomposition of the 2-propanol.

Space of a gap of the separator 15 shown in FIG. 4 has the thermal storage material (2-propanol in this case) for reacting on an anode flowing in from the thermal storage material supply port 4 and the thermal storage material in the energy storing state (acetone in this case) generated on the anode circulated therein so as to circulate into a collector A denoted by the reference numeral 6. And a shaded area of the gap of the separator 15 has the thermal storage material in the energy storing state (hydrogen in this case) generated on the cathode circulated therein so as to circulate into a collector B denoted by the reference numeral 7.

The fluid passage 10 is placed inside the thermal storage reaction portion 5 so as to enter from a water supply portion 16 and exit from a drainage portion 17 while exchanging heat with the heat exchanger 11 provided on the back of the separator 15.

As for a catalyst type of the electrode with a catalyst 12, the one having Pt, Ru, Ir and soon supported by a conducting support such as carbon or titania may be used. FIG. 4 shows a state of laminating two pairs of electrode portions 14. However, the electrode portions 14 may be increased or decreased as required, or a plurality of units of the thermal storage reaction portion 5 may be provided in series or in parallel.

Next, a description will be given as to the endothermy by the decomposition of the thermal storage material in the thermal storage reaction portion 5. If hot water is supplied from the water supply portion 16 to a portion of the fluid passage 10 placed inside the thermal storage reaction portion 5, the 2-propanol is supplied from the thermal storage material supply port 4 to the inside of the thermal storage reaction portion 5 so as to start the endothermic reaction.

Figure 5:
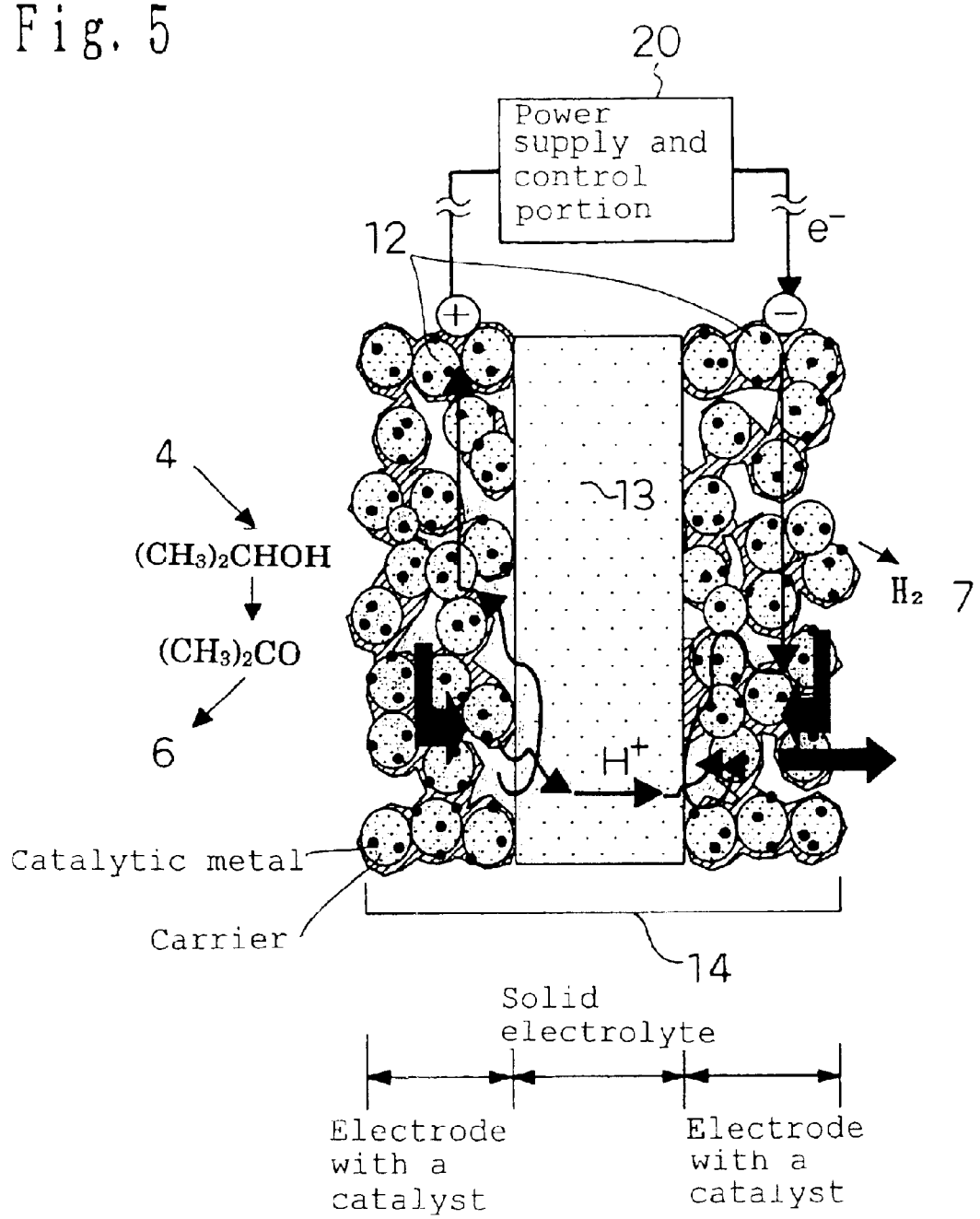
FIG. 5 is a pattern diagram of a reaction in an electrode portion according to the first embodiment of the present invention.

FIG. 5 shows a pattern diagram of the reaction in the electrode portions 14. When a decomposition reaction of the 2-propanol which is the thermal storage material starts, electric energy equivalent to $\Delta G$ is applied from the power supply and control portion 20. And the reactions to the right sides of the chemical formulas 2 and 3 progress on a first electrode (anode) and a second electrode (cathode) while absorbing the heat from the hot water flowing in the fluid passage 10 as shown in FIG. 5 to be discharged from the collector A of 6 and the collector B of 7 respectively. At this stage, the acetone generated by the chemical formula 2 including partially unresponsive 2-propanol and the hydrogen generated by the chemical formulas 3 are separated and moved to the energy storing thermal storage material tank A of 8 and the energy storing thermal storage material tank B of 9 to be stored by having valves 21 and 22 closed respectively.

Here, the energy storing thermal storage material tank B of 9 is constituted by hydrogen absorbing alloys, and stores hydrogen at several wt % or so. As for the hydrogen absorbing alloys used here, it is desirable to use a Ti—Mn series, a V series or CaNi series for instance, which can absorb and desorb hydrogen at room temperature.

Next, a description will be given as to the exothermic reaction in an exothermic reaction portion 26. The exothermic reaction portion 26 contacts with a heated fluid passage 23 via a heat exchanger+catalyst 25. And on heat generation, the acetone and hydrogen supplied from the energy storing thermal storage material tank A of 8 and the energy storing thermal storage material tank B of 9 respectively are mixed by a mixer 24 in the exothermic reaction portion 26. And they react to a hydrogenation catalyst of the heat exchanger+ catalyst 25, and provide the 2-propanol which is the thermal storage material and generate the heat to heat the water circulating in the heated fluid passage 23. The 2-propanol which is a reaction product on heat generation is stored in the thermal storage material tank 1 again by way of a valve 27. The heat exchanger+catalyst 25 is a catalyst layer film-formed on a surface of the heat exchanger. However, its form is not limited, and it may also be a sheet-like catalyst formed along the heat exchanger for instance.

The exothermic reaction in the exothermic reaction portion 26 is promoted by a heat-activated catalyst, and so it is desirable to provide heating means such as a heater to the catalyst and temporarily heat-activate the catalyst (details are not shown). The catalyst used here depends on the kind of reaction medium. In the case of the thermal storage apparatus according to the first embodiment, however, Ni and Pt catalysts and so on are suited.

A supplemental energy amount added here may be about $\Delta G$ at a temperature T shown in FIG. 1. In the case of further adding a mobile equilibrium operation such as changing a pressure, the supplemental energy amount may be smaller.

In the case where the temperature T (thermal storage temperature) for causing the decomposition reaction in the thermal storage reaction portion 5 changes, it is possible to set a necessary energy amount according to a temperature level in a computing portion provided to the power supply and control portion 20 so that it is no longer necessary to add unnecessary energy. In particular, an object of the present invention is to store the heat as low-temperature as possible. Therefore, it is desirable to detect the temperature on a downstream side to a flow direction of the thermal storage reaction portion 5 of which temperature is apt to be reduced by the decomposition reaction, and the temperature of the electrode with a catalyst 12 in particular by temperature detection means such as a thermocouple or a thermistor so as to use it for calculation of the necessary energy amount (the temperature detection means is not shown). The power supply and control portion 20 having the computing portion for setting the necessary energy is an example of a supplemental energy control portion of the present invention.

The thermal storage apparatus according-to the first embodiment has the thermal storage reaction portion 5 and the exothermic reaction portion 26 separately provided. In the case where a speed condition of the exothermic reaction is satisfied, however, they may be the same. In this case, it is possible to consider that the fluid passage 10 and the heated fluid passage 23 are the same. Although it is not necessary to apply a potential on heat generation, the potential may be applied in a direction reverse to thermal storage time for the sake of promoting the reaction.

The electrode portions 14 are an example of a supplemental energy supply portion of the present invention. The thermal storage material tank 1 is an example of a thermal storage material storage portion of the present invention, and the energy storing thermal storage material tank A and the energy storing thermal storage material tank B of 8 and 9 are examples of the energy storing thermal storage material storage portions of the present invention. The 2-propanol is an example of the thermal storage material satisfying reaction conditions of the formulas 1 and 2 of the present invention. The fluid passage 10 is an example of a heating fluid passage of the present invention. And the fluid passage 10 is also an example of a heat source of the present invention.

The heat source of the present invention is not limited to the fluid passage 10 of this embodiment, but may be a heater or the like. In short, the heat source of the present invention may be any device to heat the thermal storage reaction portion.

(Second Embodiment)

Figure 6:
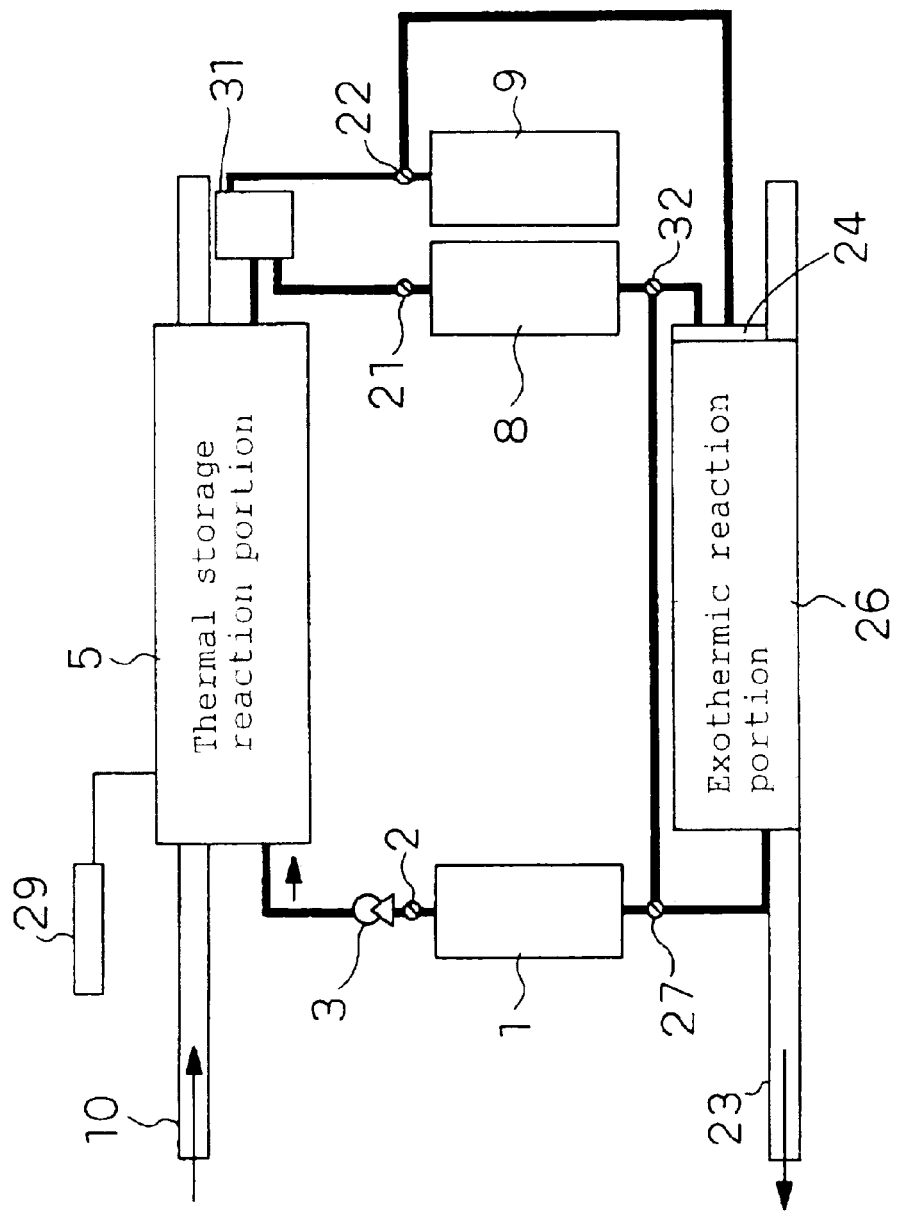
FIG. 6 is a schematic view of the thermal storage apparatus according to a second embodiment of the present invention.
Figure 7:
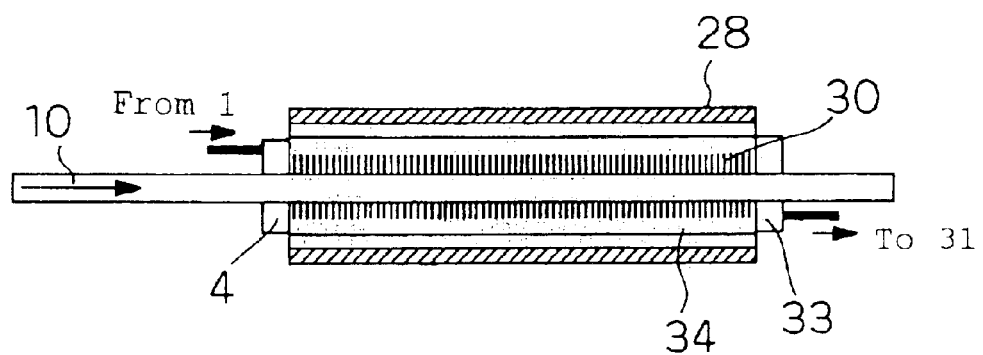
FIG. 7 is a schematic view of the thermal storage reaction portion of the thermal storage apparatus according to the second embodiment of the present invention.

The thermal storage apparatus according to a second embodiment of the present invention will be described as to its configuration and operation based on FIGS. 6 and 7. FIG. 6 shows a schematic view of the thermal storage apparatus according to the second embodiment, and FIG. 7 shows a schematic view of the thermal storage reaction portion thereof. The second embodiment and the first embodiment are different in that the supplemental energy equivalent to ΔG in the thermal storage reaction portion 5 is electricity according to the first embodiment while that is light according to the second embodiment.

According to the second embodiment, the supplemental energy is light, and so it is constituted as shown in FIG. 7 so that the light from a light exposure portion 28 is effectively illuminated on the catalyst of the thermal storage reaction portion 5. The thermal storage reaction portion 5 is comprised of the light exposure portion 28, the fluid passage 10 and a reaction chamber 34 wherein a photocatalyst with titania as its main component having a Pt-series catalyst dispersedly supported is integrated with a heat exchanger and provided as a heat exchanger+photocatalyst 30. The reaction chamber 34 surrounds the fluid passage 10, and absorbs the light illuminated from the light exposure portion 28 laid out separately.

Next, the decomposition or separation reaction in the thermal storage reaction portion 5 will be described. The 2-propanol is provided as the thermal storage material from the thermal storage material supply port 4 to the thermal storage reaction portion 5. And if the hot water is supplied to the portion of the fluid passage 10 placed inside the thermal storage reaction portion 5, the light is illuminated by the light exposure portion 28 so that the 2-propanol is decomposed (thermal storage reaction) by being supplemented by light energy. And the reaction chamber 34 absorbs thermal energy from the hot water circulating in the fluid passage 10. And the thermal storage material in the energy storing state generated by the decomposition is discharged from a thermal storage material outlet 33 in the energy storing state.

In FIG. 7, the light exposure portion 28 is provided outside the reaction chamber 34. It is also feasible, in the case of the configuration capable of the decomposition or separation, to use the configuration in which a laid-out light exposure portion is provided inside the reaction chamber 34 and the reaction chamber 34 is provided outside it.

Here, it is possible to use an ultraviolet lamp or a black light as the light exposure portion 28. An illumination amount and a wavelength of the light are controlled by the power supply and control portion 29 according to the temperature of the thermal storage reaction portion 5 as with the first embodiment. It is also possible to recover the generated heat by using the heat exchanger separately other than light exposure energy in the light exposure portion 28 and use it for preheat of a reactive medium and so on again.

It is desirable that the wavelength of the light source used in the light exposure portion 28 is appropriately selected by considering the kind of photocatalyst to be used. An emission principle is not limited to the heat and discharge, and it is sufficient to have the light. Therefore, it is possible to use a light-emitting diode and so on in the case where a light exposure energy amount may be small so that voluntariness of design is improved. It is also possible to use sunlight by using the photocatalyst such as modification titania responsive to visible light and rendering the light exposure portion 28 as light-transmitting glass. And pluralities of light exposure portions 28 and reaction chambers 34 corresponding thereto may be provided respectively. The light exposure portion 28, reaction chamber 34 and heat exchanger+photocatalyst 30 are formed as if surrounding the fluid passage 10. It is possible, however, in the case of forming the reaction chambers 34 like a plate, to provide them on one side and insulate the other side with an insulating material.

A mixture of the acetone and hydrogen as the thermal storage material in the energy storing state generated by a photocatalyst reaction is separated in a separation portion denoted by a reference numeral 31 by means of condensation and a separation membrane. The hydrogen separated as a gas is stored in the energy storing thermal storage material tank B of 9. As for the acetone, the portion generated as liquid and the portion generated in a condensation portion belonging to the separation portion 31 are joined to be stored in the energy storing thermal storage material tank A of 8. It is also possible to perform heat recovery as to a heat quantity generated in the condensation portion belonging to the separation portion 31.

As for the energy storing thermal storage material tank A of 8, it is also possible to provide a bypass for returning it to the thermal storage material tank 1 via valves 32 and 27 without going through the exothermic reaction portion 26. Thus, in the case where the reaction in the thermal storage reaction portion 5 has not sufficiently progressed, it can be used for the reaction in the thermal storage reaction portion 5 again by way of the bypass without going through the exothermic reaction portion 26. In that case, the hydrogen is eliminated in the energy storing thermal storage material tank B in the thermal storage state of 9.

The operation of the endothermic reaction in the exothermic reaction portion 26 is the same as the case of the thermal storage apparatus according to the first embodiment, and so a detailed description thereof will be omitted.

As for the thermal storage apparatus according to the second embodiment, its supplemental energy is the light. Therefore, it is necessary to enlarge area of the catalyst of thermal storage reaction portion 5 so that the light from the light exposure portion 28 is illuminated thereon effectively enough. Thus, apparatus size of the thermal storage apparatus according to the second embodiment becomes larger than that of the thermal storage apparatus according to the first embodiment of which supplemental energy is the electricity. There is an advantage, however, that it requires no cost for using the supplemental energy in the case of using the sunlight as the supplemental energy for the thermal storage apparatus according to the second embodiment.

The light exposure portion 28 is an example of the supplemental energy supply portion of the present invention. As with the first embodiment, the thermal storage material tank 1 is an example of the thermal storage material storage portion of the present invention. The energy storing thermal storage material tank A and the energy storing thermal storage material tank B of 8 and 9 are examples of the storage portions of the present invention. The 2-propanol is an example of the thermal storage material satisfying the reaction conditions of the formulas 1 and 2 of the present invention.

(Third Embodiment)

Figure 8:
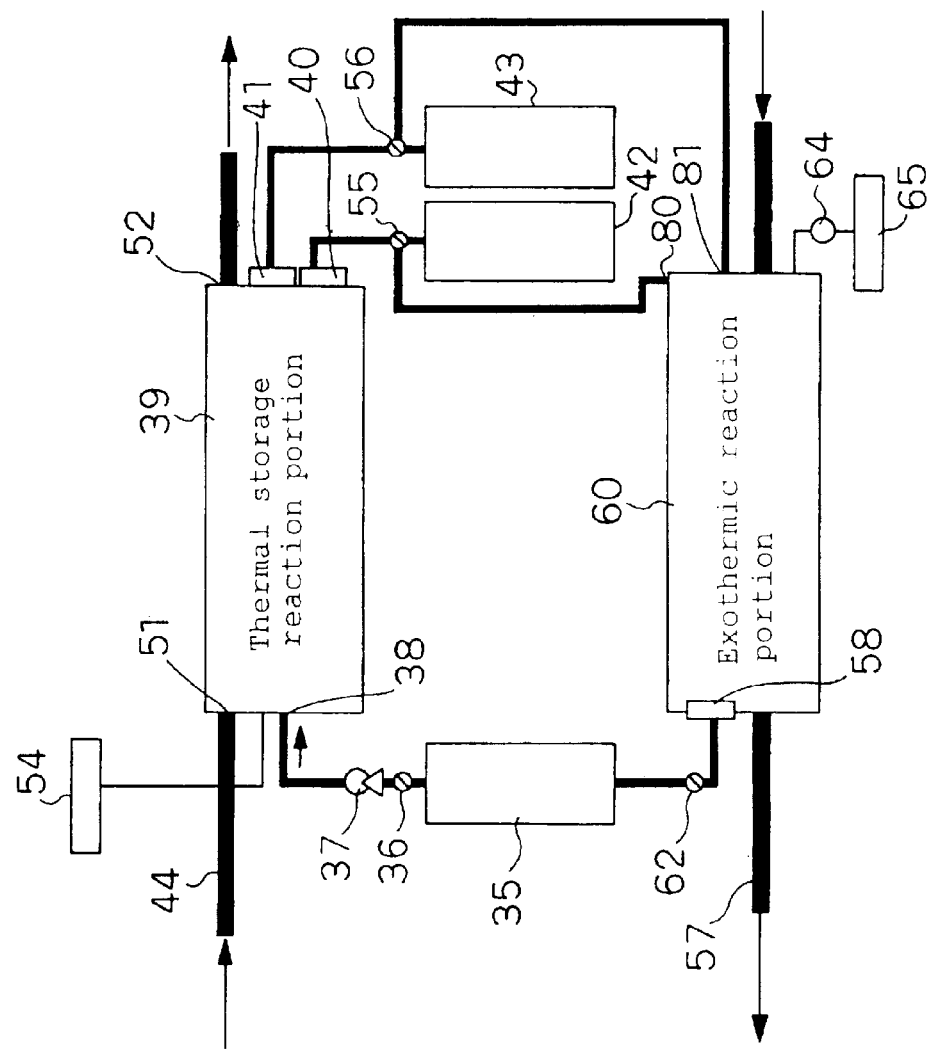
FIG. 8 is a schematic view of the thermal storage apparatus according to a third embodiment of the present invention.

FIG. 8 shows a block diagram of the thermal storage apparatus according to a third embodiment of the present invention. A description will be given, based on FIG. 8, as to the configuration and operation of the thermal storage apparatus according to the third embodiment utilizing the relationships in the chemical formulas 2 and 3.

On the thermal storage, the hot water generated by the sunlight, electric heater and heat pump hot-water supply apparatus and so on is circulating in a fluid passage 44. The hot water may be another heat medium such as a cooling medium heated in a refrigeration cycle of a heat pump for instance.

First, the operation on the thermal storage will be described. A valve 36 opens, and the 2-propanol as the thermal storage material from a thermal storage material tank 35 is supplied by a pump 37 to the inside of a thermal storage reaction portion 39 from a thermal storage material supply port 38. In the thermal storage reaction portion 39, as with the first embodiment, the 2-propanol is decomposed (dehydrogenizing reaction) and converted to the acetone and hydrogen by the heat of the fluid passage 44 and the electrical energy supplementally supplied from a power supply and control portion 54 separately so as to have the heat of the fluid passage 44 absorbed by the endothermy at that time. The acetone and hydrogen are collected by a collector A denoted by a reference numeral 40 and collector B denoted by a reference numeral 41, and are stored in an energy storing thermal storage material tank A denoted by a reference numeral 42 and an energy storing thermal storage material tank B denoted by a reference numeral 43 respectively.

Figure 9:
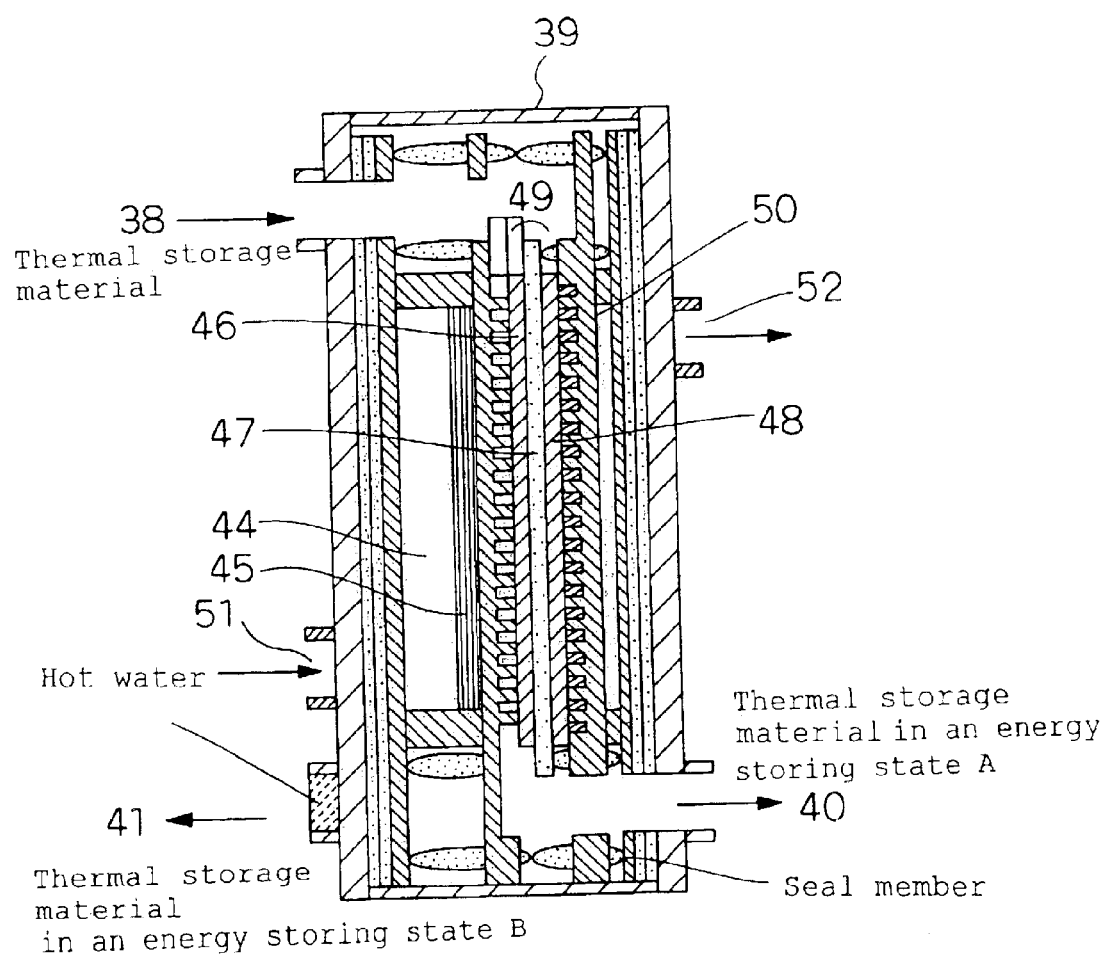
FIG. 9 is a schematic view of the thermal storage reaction portion of the thermal storage apparatus according to the third embodiment of the present invention.

Here, FIG. 9 shows a schematic view of the inside of the thermal storage reaction portion 39. As shown in FIG. 9, inside the thermal storage reaction portion 39, an electrode portion 49 thermally contacts with the fluid passage 44 via a heat exchanger 45. And the electrode portion 49 is comprised of a first electrode with a catalyst 46, a solid electrolyte 47 and a second electrode with a catalyst 48. In this case, the decomposition of the 2-propanol as the thermal storage material occurs on the first electrode 46 which is closer to the fluid passage 44.

The space of the gap of a separator 50 shown in FIG. 9 has the thermal storage material (2-propanol) supplied from the thermal storage material supply port 38 and the thermal storage material in the energy storing state (acetone in this case) generated on the anode (first electrode 46) circulated therein so as to circulate into the collector A of 40. And a shaded area of the gap of the separator 50 has the thermal storage material in the energy storing state (hydrogen in this case) generated on the cathode (second electrode 48) circulated therein so as to circulate into the collector B of 41.

Inside the thermal storage reaction portion 39, the fluid passage 44 is placed to enter from a water supply portion 51 and exit from a drainage port 52 while exchanging the heat with the heat exchanger 45 provided on the back of the separator 50.

The 2-propanol and acetone are examples of the thermal storage material and the other thermal storage material in the energy storing state of the present invention. The thermal storage material tank 35, fluid passage 44 and hot water flowing in the fluid passage 44 are examples of the thermal storage material storage portion, heating fluid passage and heating fluid of the present invention. And the energy storing thermal storage material tank A of 42 and the energy storing thermal storage material tank B of 43 are examples of the energy storing thermal storage material storage portion of the present invention.

Here, as for the catalyst type of the first electrode 46 and the second electrode 48, the one having Pt, Ru, Ir and so on supported by the conducting support such as carbon or titania may be used. It is also possible, as required, to provide electrode portion 49 laminated into a plurality of layers inside the thermal storage reaction portion 39. Or else, it is also possible to provide a plurality of units themselves of the thermal storage reaction portion 39.

Next, a description will be given as to the decomposition reaction in the thermal storage reaction portion 39. If the hot water is supplied to a portion of the fluid passage 44 placed inside the thermal storage reaction portion 39, the 2-propanol as the thermal storage material is supplied from the thermal storage material supply port 38 to the inside of the thermal storage reaction portion 39 so as to start the decomposition reaction.

Figure 10:
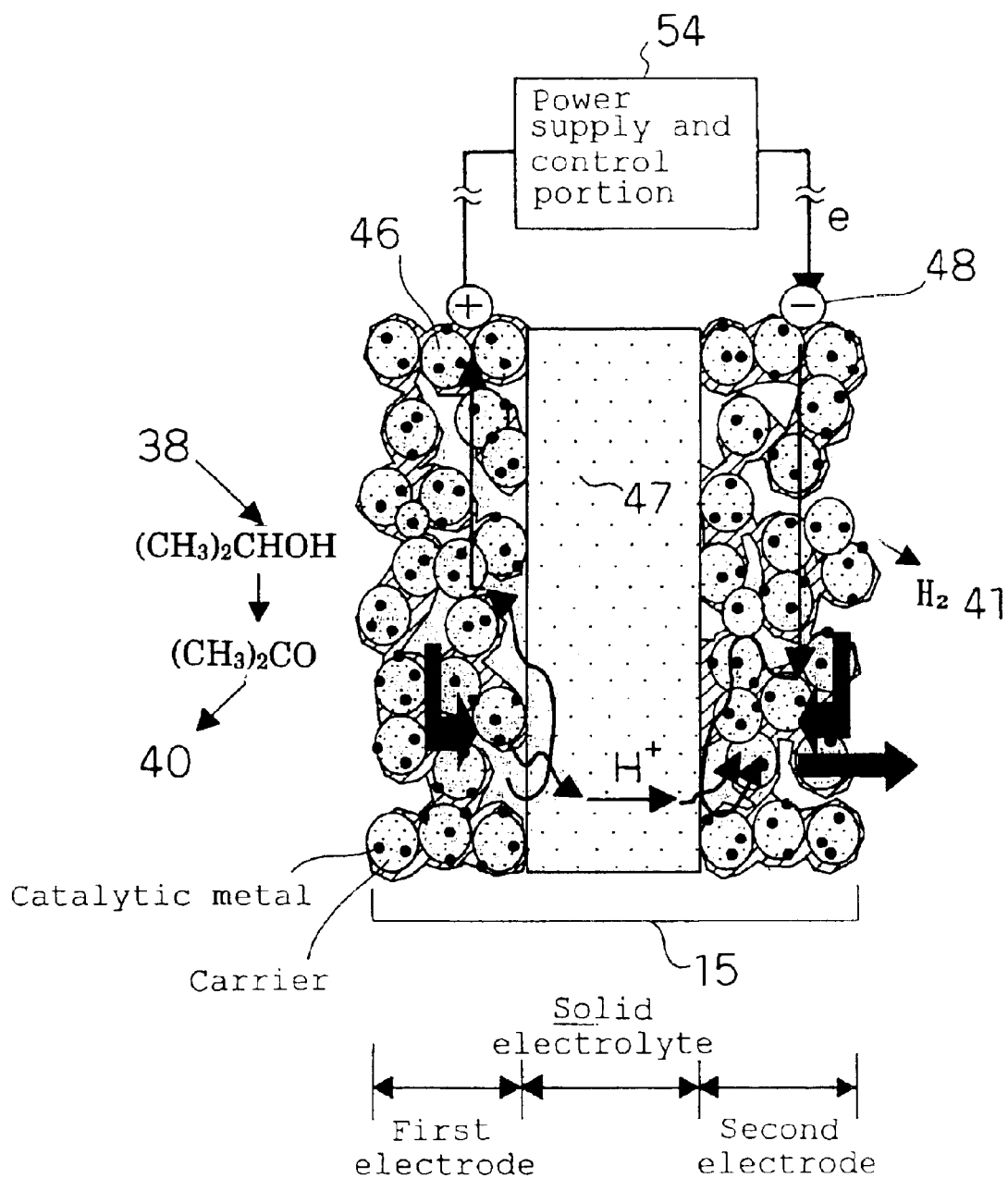
FIG. 10 is a pattern diagram of a reaction in the electrode portion of the thermal storage apparatus according to the third embodiment of the present invention.

FIG. 10 shows a pattern diagram of the decomposition of the thermal storage material in the electrode portions 49. When the decomposition reaction of the 2-propanol which is the thermal storage material starts, the electric energy equivalent to $\Delta G$ is applied from the power supply and control portion 54. And the reactions to the right sides of the chemical formulas 2 and 3 progress on the anode (first electrode 46) and the cathode (second electrode 48) while absorbing the heat from the hot water flowing in the fluid passage 44 as shown in FIG. 10 to be discharged from the collector A of 40 and the collector B of 41 respectively. At this stage, the acetone generated by the chemical formula 2 including partially unresponsive 2-propanol and the hydrogen generated by the chemical formulas 3 are separated and discharged from the collector A of 40 and the collector B of 41 respectively. And these products (thermal storage material in the energy storing state) are moved to the energy storing thermal storage material tank A of 42 and the energy storing thermal storage material tank B of 43 to be stored by having valves 55 and 56 closed respectively. The power supply and control portion 54 is an example of the supplemental energy supply portion of the present invention.

Here, the energy storing thermal storage material tank B of 43 is constituted by the hydrogen absorbing alloys as with the first embodiment.

In the case of using an AC power supply for the power supply and control portion 54, the power supply and control portion 54 will contain an AC to DC conversion function so as to use it by converting it to a direct current.

Figure 11:
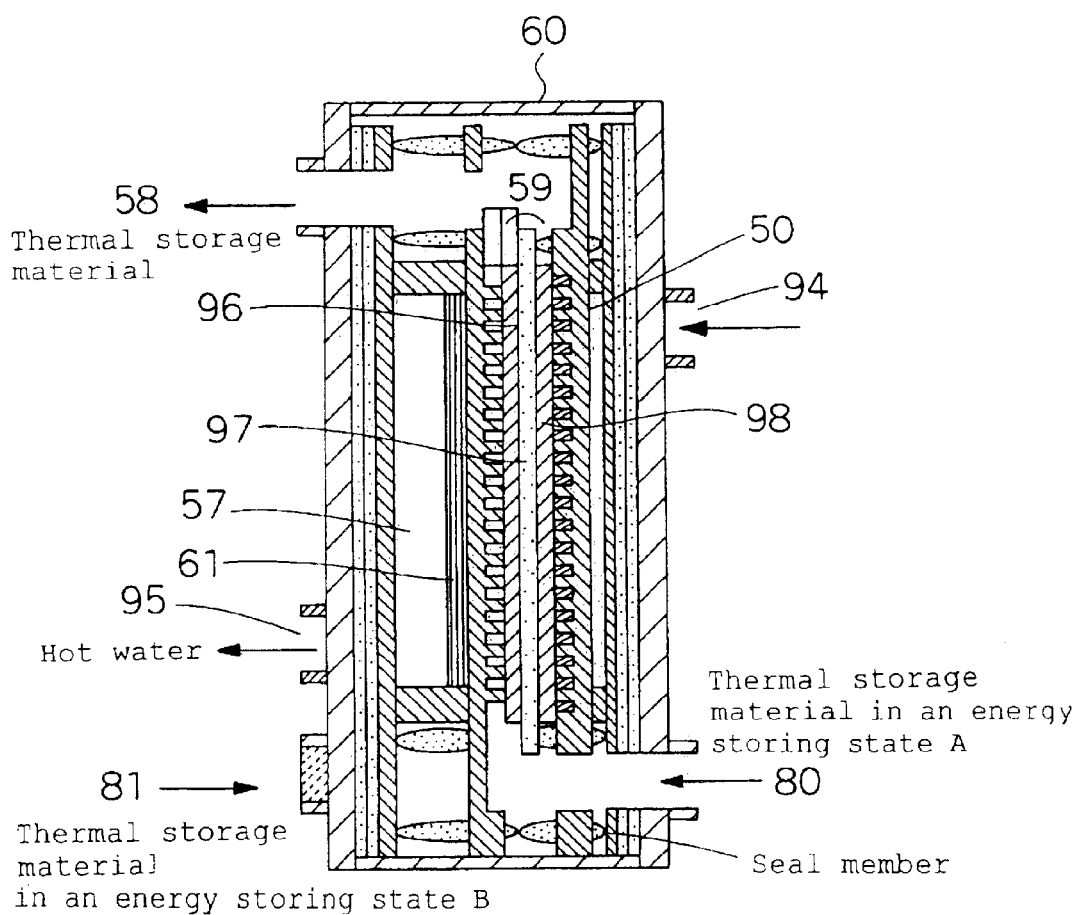
FIG. 11 is a schematic view of an exothermic reaction portion of the thermal storage apparatus according to the third embodiment of the present invention.

Next, a description will be given as to the exothermic reaction on radiation in an exothermic reaction portion 60. FIG. 11 shows a schematic view of the inside of the exothermic reaction portion 60.

The exothermic reaction portion 60 has a heated fluid passage 57 in contact with an electrode portion 59 via a heat exchanger 61. The acetone from the energy storing thermal storage material tank A of 42 is supplied from an energy storing thermal storage material supply portion A denoted by reference numeral 80, and the hydrogen from the energy storing thermal storage material tank B of 43 is supplied from an energy storing thermal storage material supply portion B denoted by reference numeral 81 respectively. And they react on a first electrode 96 side of the electrode portion 59, and provide the 2-propanol and generate the heat to heat the water circulating in the heated fluid passage 57.

At this time, as shown in FIG. 8, the 2-propanol which is the thermal storage material reproduced by the reaction of the exothermic reaction portion 60 is stored in the thermal storage material tank 35 again by way of a valve 62 from a thermal storage material collector 58. The reaction at this time is the reaction to left sides of the chemical formulas 2 and 3, and the electricity is generated simultaneously with the heat generation. To be more specific, the reaction to the left side of the chemical formula 1 is under the condition apt to progress thermodynamically, and so the hydrogen generated in the thermal storage reaction portion 39 is supplied from the energy storing thermal storage material supply portion B of 81, and the acetone as the other thermal storage material in the energy storing state is supplied from the energy storing thermal storage material supply portion A of 80. Then, the reaction of the thermal storage material in the energy storing state B (hydrogen) to the left side of the chemical formula 3 progresses on a second electrode 98. And hydrogen ion moves as proton to a first electrode 96 side by way of a solid electrolyte 97 so that the thermal storage material (2-propanol) is generated by the reaction to the left side of the chemical formula 2.

Here, as shown in FIG. 8, the electrode portion 59 is connected to an electricity storage portion 65 via an electric terminal 64, and the electricity generated by an electronic flow accompanying the reaction to the left side of the chemical formula 2 can be stored as-is in the electricity storage portion 65.

The heated fluid passage 57, water flowing in the heated fluid passage 57, electricity storage portion 65 and electric terminal 64 are examples of the heated fluid passage, heated fluid, electricity storage means and electricity takeout terminal of the present invention respectively. The second electrode 98 and first electrode 96 are examples of the first and second electrodes of the present invention respectively, and the solid electrolyte 97 is an example of the electrolyte of the present invention.

The exothermic reaction portion 60 has a heat capacity, and it takes time until the water inside the heated fluid passage 57 gets heated. For that reason, heating means (not shown) such as the heater is provided to thermally contact a part or the entirety of the first electrode 96 in the exothermic reaction portion 60 to heat it with the electricity supplied from the electricity storage portion 65 so as to heat the heated fluid more promptly. As for the electricity storage portion 65, it is possible to use a storage battery such as an Ni—H battery or an Li battery or a high-capacity capacitor according to output. The heating means provided here is an example of electric heat conversion means of the present invention.

Electric output from the electricity storage portion 65 may be used as the supplemental energy of the thermal storage reaction portion 39 on decomposition or separation of the thermal storage material. In this case, as to losses due to Joule heat on generating the electricity, supplies will be provided from a system power supply and so on from the power supply and control portion 54 separately. To be more specific, heating means such as a heater is provided to the thermal storage reaction portion 39 so as to heat the thermal storage reaction portion 39 with the electricity supplied from the electricity storage portion 65. The heating means provided to the thermal storage reaction portion 39 is an example of the thermal storage reaction portion heating means of the present invention. It is also possible, by using it for heating of the energy storing thermal storage material tank B of 43 having the hydrogen stored therein, to secure a speed of hydrogen supply to the electrode portion 59 on the exothermic reaction. The electricity stored in the electricity storage portion 65 may also be used for purposes other than these.

An electrical energy amount as the supplemental energy to be added to the thermal storage reaction portion 39 on decomposition or separation may be equivalent to $\Delta G$ or so in the temperature T (room temperature in this case) shown in FIG. 1. Furthermore, the supplemental energy amount can be reduced in the case of further adding the mobile equilibrium operation by pressure change and so on.

In the case where the temperature T (thermal storage temperature) for causing the decomposition or separation changes, it is possible to calculate and set the necessary energy amount in the computing portion provided to the power supply and control portion 54 so that it is no longer necessary to add unnecessary energy. In particular, to store the heat as low-temperature as possible, it is desirable to detect the temperature on the downstream side to the flow direction of the thermal storage reaction portion 39 of which temperature is apt to be reduced by the endothermic reaction, and the temperature of the first electrode 46 in particular by the temperature detection means (not shown) such as the thermocouple or thermistor so as to use it for the calculation of the necessary energy amount.

Figure 12:
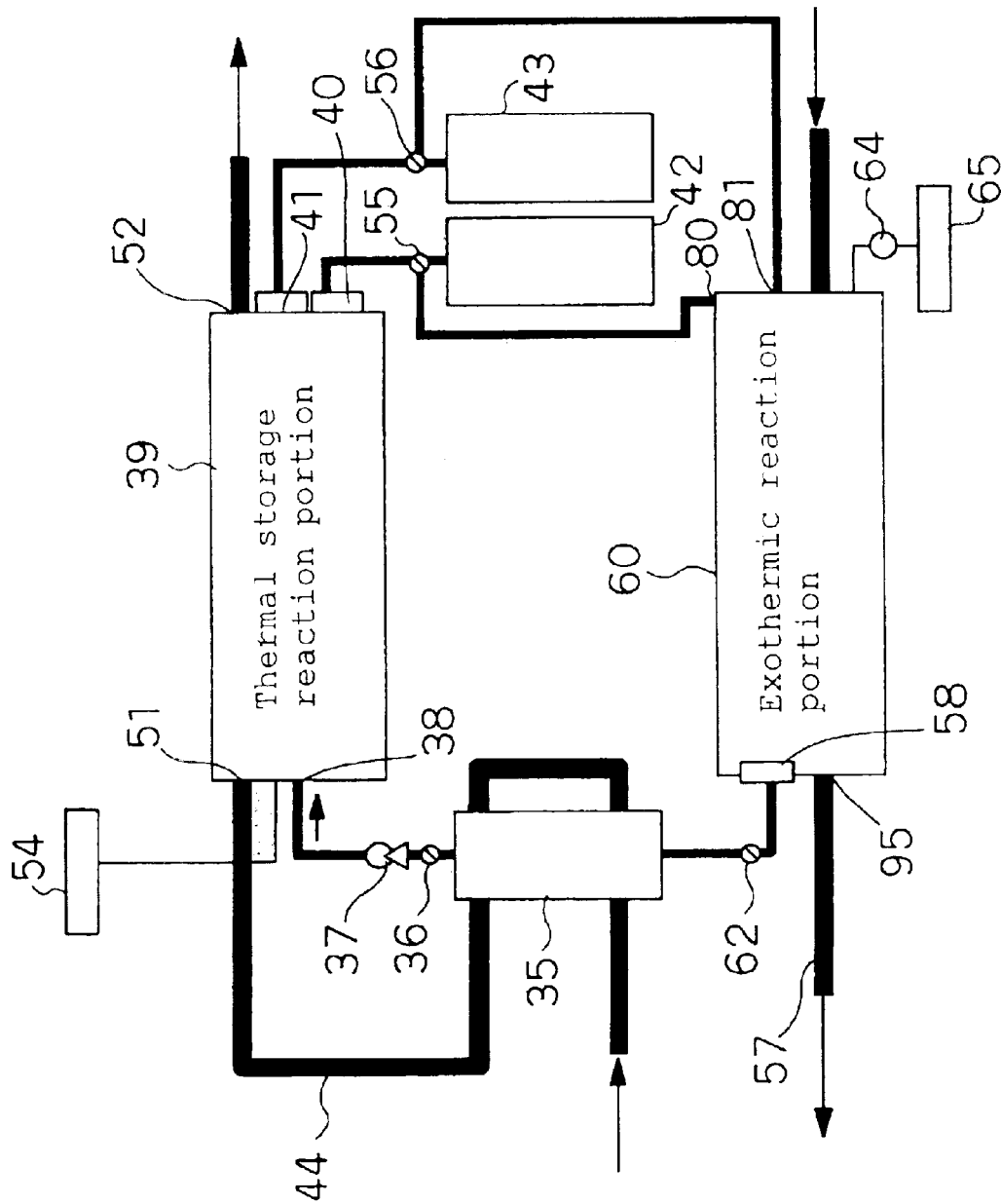
FIG. 12 is a schematic view of another configuration of the thermal storage apparatus according to the third embodiment of the present invention.
Figure 13:
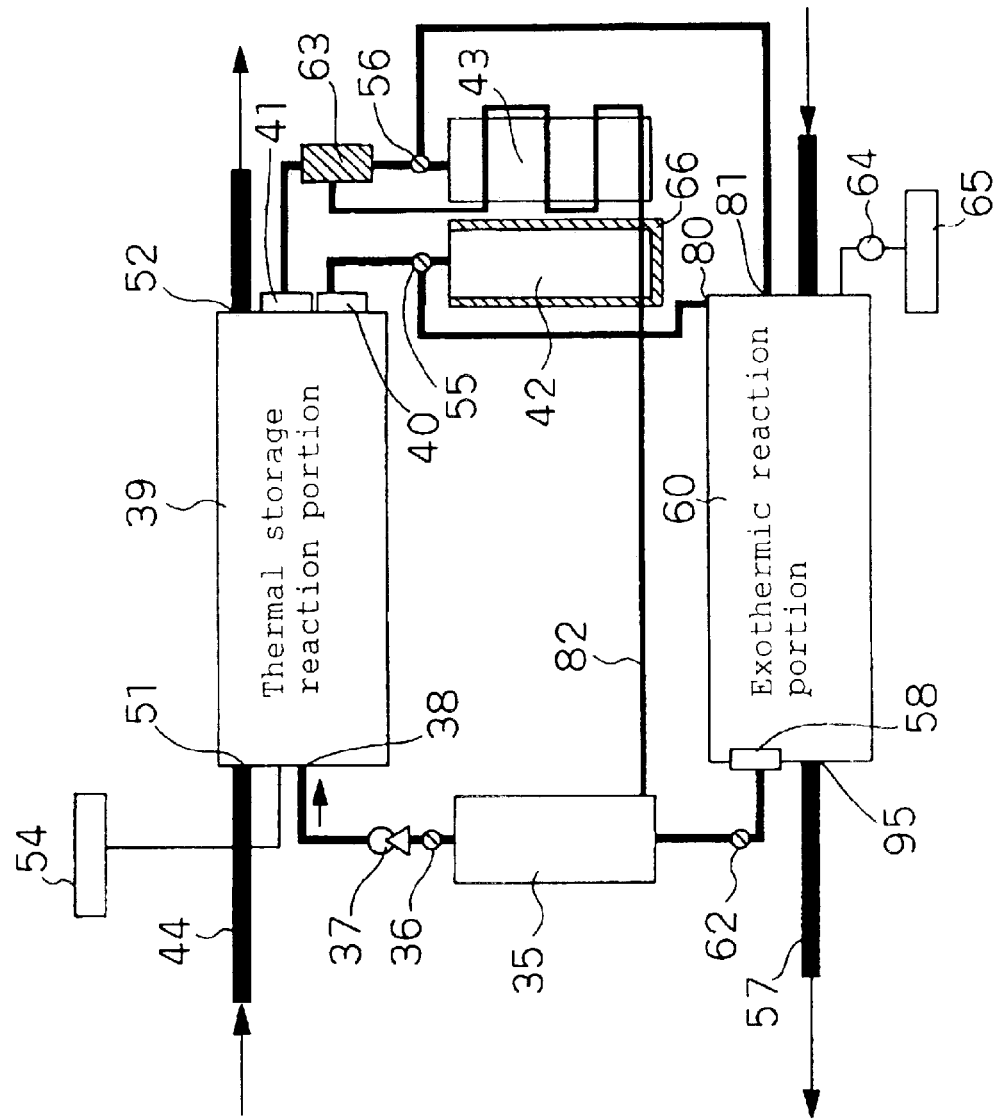
FIG. 13 is a schematic view of another configuration of the thermal storage apparatus according to the third embodiment of the present invention.

FIGS. 12 and 13 show block diagrams of other configurations of the thermal storage apparatus according to the third embodiment.

The fluid passage 44 simply contacts with only the thermal storage reaction portion 39 in FIG. 8. As shown in FIG. 12, however, if it is constituted to contact the thermal storage reaction portion 39 after performing the heat exchange in the thermal storage material tank 35, the 2-propanol as the thermal storage material is gasified and supplied to the thermal storage reaction portion 39 so that it is no longer necessary to install the pump 37 and so on. Or else, even if the pump 37 is installed, it is possible to install a small pump of which power consumption is low. In this case, it is possible to apply the electrical energy as the supplemental energy to the thermal storage reaction portion 39 and promote the decomposition in timing by prescribing the temperature of the thermal storage material tank 35 for instance so as to reduce unnecessary use of electricity and perform efficient thermal storage.

As shown in FIG. 13, as for the energy storing thermal storage material tank A of 42 for storing a liquid system product (acetone in this case), it is possible, by insulating it from the outside with glass wool or other insulating means 66, to curb the radiation of the thermal storage material in the energy storing state in storage even in the case where the outside is refrigerated. Furthermore, it is possible to partially store the heat as the sensible heat so that the thermal storage temperature can be set rather high and the supplemental energy amount supplied to the electrode portions 49 can be reduced.

As shown in FIG. 13, as regards the passage of the hydrogen generated from the second electrode 48 of the thermal storage reaction portion 39, it is also feasible, in the configuration in FIG. 8, to place a heat exchanger 63 for thermally contacting the thermal storage material tank 35 by heat transmission means 82 between the collector B of 41 and the energy storing thermal storage material tank B of 43. It is possible, by having such a configuration, to recover and cool the sensible heat of the hydrogen generated by the thermal storage reaction portion 39 and use it to heat the thermal storage material tank 35 so as to curb sensible heat loss accompanying the storage in the energy storing thermal storage material tank B of 43. It is also feasible, by putting the heat exchanger 63 also in contact with the energy storing thermal storage material tank B of 43, to recover the generated heat accompanying the hydrogen absorption in the energy storing thermal storage material tank B of 43.

In the case of using a cation-exchange polymer or the like for the solid electrolyte 47, it is desirable to humidify the solid electrolyte 47. In this case, a humidification unit may be provided separately. Or to simplify it, it can be implemented by including several to 50 percent of water in the reactive medium (2-propanol in this case) as the thermal storage material and providing an accumulation portion between the collector B of 41 and the energy storing thermal storage material tank B of 43.

Likewise, in the case of using a cation-exchange polymer or the like for the solid electrolyte 97 of the exothermic reaction portion 60, it is desirable to humidify the solid electrolyte 97. In this case, as in the case of the thermal storage reaction portion 39, the humidification unit may also be provided separately, and it is also feasible to supply to the exothermic reaction portion 60 the water of the accumulation portion provided between the collector B of 41 and the energy storing thermal storage material tank B of 43 by mixing it with the reactive medium (hydrogen in this case).

According to the third embodiment, the thermal storage apparatus has the thermal storage reaction portion 39. It is also possible, however, to utilize the exothermic reaction portion 60 of the thermal storage apparatus of the third embodiment and apply it to a fuel battery. As for the fuel battery in this case, the water flowing in the heated fluid passage 57 placed inside the exothermic reaction portion 60 is heated so as to allow the heat generated on power generation to be taken out. To be more specific, it is possible to constitute the fuel battery capable of taking out the electrical energy and thermal energy at the same time.

(Fourth Embodiment)

Figure 15:
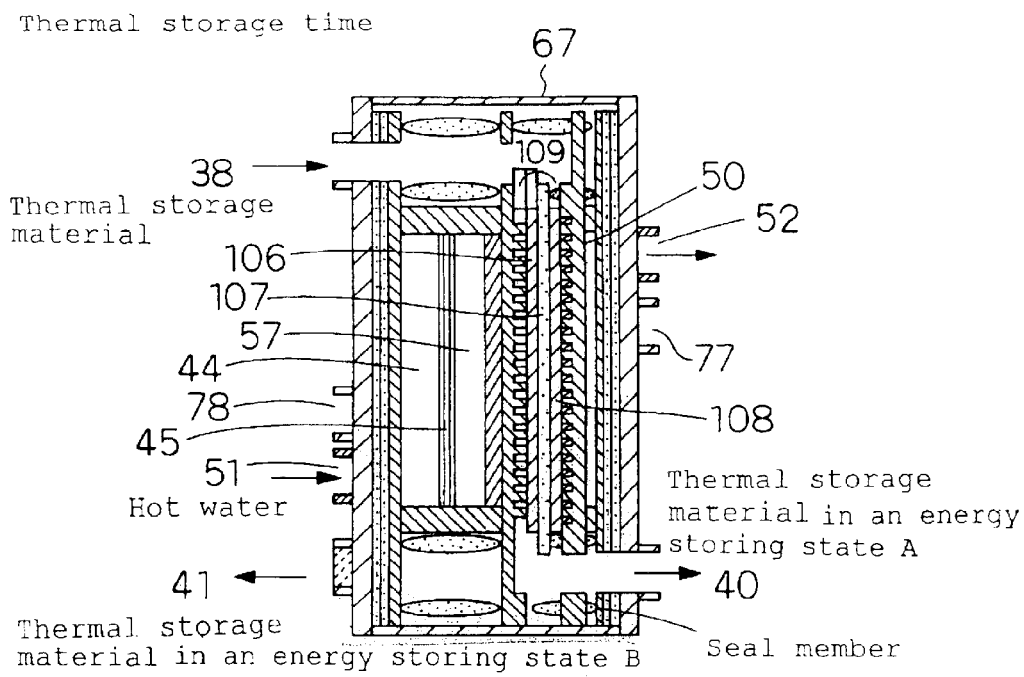
FIGS. 15(A) and (B) is a schematic view of a reaction portion of the thermal storage apparatus according to the fourth embodiment of the present invention.
Figure 15:
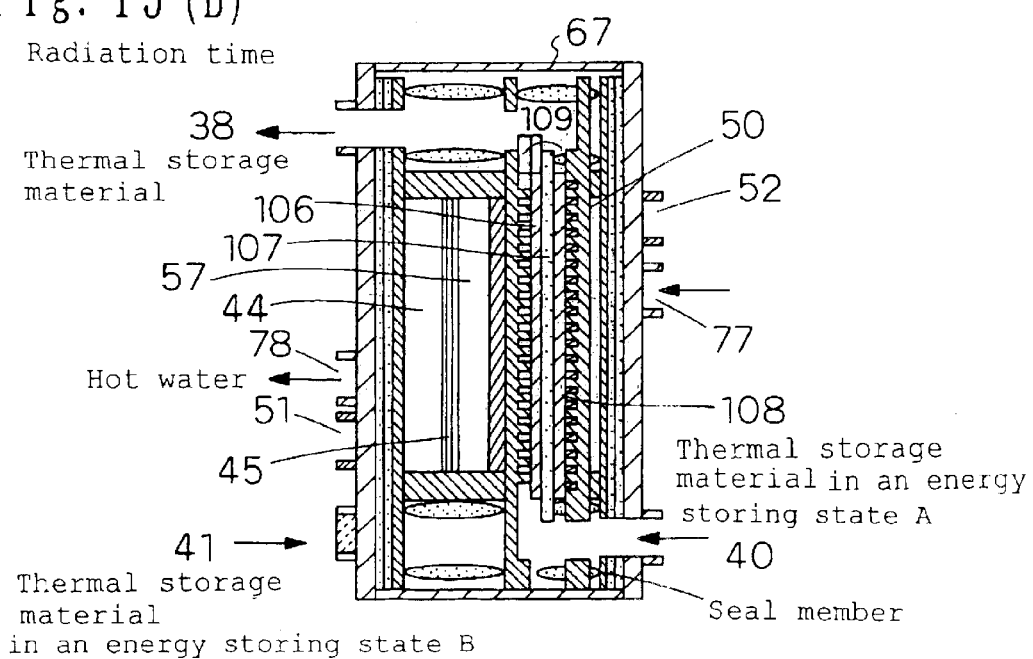

The thermal storage apparatus according to a fourth embodiment of the present invention will be described as to its configuration and operation based on FIGS. 14 and 15. The thermal storage apparatus according to the fourth embodiment is different from that of the third embodiment in that the thermal storage reaction portion 39 of the third embodiment doubles as the exothermic reaction portion 60.

FIGS. 14(A) and (B) show block diagrams of the thermal storage apparatus according to the fourth embodiment, where FIGS. 14(A) and 14(B) show a thermal storage time and a radiation time respectively. In FIGS. 14(A) and 14(B), the portions indicated by the same reference symbols as in FIG. 8 are the same as those in FIG. 8. FIGS. 15(A) and (B) show a block diagram of a reaction portion 67 doubling as the thermal storage reaction portion and exothermic reaction portion of the thermal storage apparatus according to the fourth embodiment, where FIGS. 15(A) and 15(B) show a thermal storage time and a radiation time respectively.

The reaction portion 67 has the same configuration as the thermal storage reaction portion 39 of the third embodiment. As shown in FIGS. 15(A) and (B), however, the heated fluid passage 57 is placed inside it together with the fluid passage 44. An electrode portion 109 of the reaction portion 67 is comprised of a first electrode with a catalyst 106, a solid electrolyte 107 and a second electrode with a catalyst 108 as with the electrode portions 49 of the thermal storage reaction portion 39 of the third embodiment. The 2-propanol as the thermal storage material is decomposed on the first electrode 106 of the electrode portion 109 on thermal storage so as to cause the endothermy.

The exothermic reaction on radiation is caused when the hydrogen supplied from the energy storing thermal storage material tank B of 43 is dissociated and activated on the second electrode 108, and is supplied to the first electrode 106 via the solid electrolyte 107, and then react with the acetone separately supplied from the energy storing thermal storage material tank A of 42 on the first electrode 106. At this time, it is often preferable for a user to have the radiation performed faster than the thermal storage. For that reason, compared to the endothermy from the fluid passage 44, the heated fluid passage 57 needs to perform heat exchange with the first electrode 106 and get heated faster, and so the heated fluid passage 57 is provided closer to the first electrode 106 than the fluid passage 44.

It is desirable to provide a control valve and exert control so that the fluid such as water inside the heated fluid passage 57 on thermal storage and the fluid in the fluid passage 44 on radiation substantially stand still. To be more specific, it is desirable to provide the control valve for controlling the flow of the fluid in the fluid passage 44 and the control valve for controlling the flow of the water in the heated fluid passage 57 respectively.

The fluid passage 44 and the heated fluid passage 57 are provided separately in FIGS. 14(A) and (B) In the case where the same medium is flowing in both, it is also possible to render these passages common and appropriately select a passage direction and a heating location.

And the electrode portion 109 has its connection switched from the power supply and control portion 54 to the electric terminal 64 by switching a switch 76, where the generated electricity is stored in the electricity storage portion 65 by way of the electric terminal 64. And the stored electricity maybe used as with the third embodiment. To be more specific, the switch 76 is switched so as to electrically connect the power supply and control portion 54 to the electric terminal 64 on thermal storage, and the generated electricity is stored in the electricity storage portion 65 by way of the electric terminal 64 on radiation. The switch 76 is an example of switching means of the present invention. The reaction portion 67 is an example of the exothermic reaction portion doubling as the thermal storage reaction portion of the present invention.

As described above, the thermal storage apparatus according to the fourth embodiment of the present invention takes the configuration of the reaction portion 67 in which the thermal storage reaction portion is identified with the exothermic reaction portion so that volume and weight of the reaction portion 67 are reduced and the thermal storage apparatus further compact than the thermal storage apparatus according to the third embodiment can be constituted.

As for the Joule heat in the electrode portion 109 of the reaction portion 67 generated in conjunction with the power generation on radiation, it can be used for heating of the heated fluid passage 57 through the first electrode 106.

(Fifth Embodiment)

Figure 16:
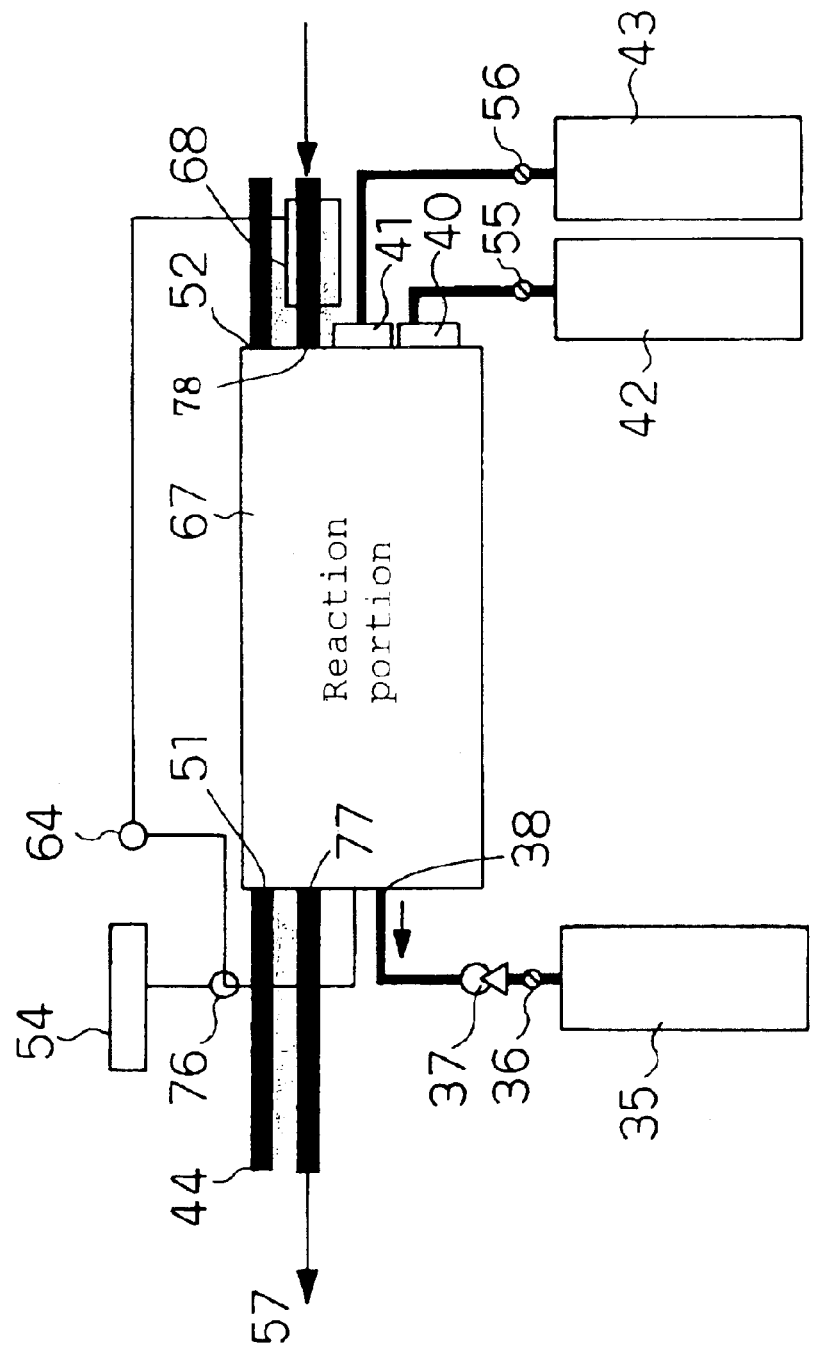
FIG. 16 is a schematic view of the thermal storage apparatus according to a fifth embodiment of the present invention.

The thermal storage apparatus according to a fifth embodiment of the present invention will be described as to its configuration and operation based on FIGS. 15(A) and (B) and 16. The thermal storage apparatus according to the fifth embodiment is different from that of the fourth embodiment in that the electric terminal 64 is connected to an electric heat conversion portion 68 as shown in FIG. 16. The configuration of the reaction portion 67 according to the fifth embodiment is the same as that of the reaction portion 67 according to the fourth embodiment, and FIGS. 15(A) and (B) show the block diagram thereof.

FIG. 16 shows a block diagram of the thermal storage apparatus according to the fifth embodiment. In FIG. 16, the portions indicated by the same reference symbols as in FIGS. 14(A) and (B) are the same as those in FIGS. 14(A) and (B) The electric heat conversion portion 68 can be the heater, thermoelectric element, heat pump or something similar. As for the thermal storage apparatus according to the fifth embodiment, a description will be given as to the case where the electric heat conversion portion 68 is the heater.

The operation on thermal storage is performed as in the case of the fourth embodiment. On radiation, however, the electricity simultaneously generated on causing the exothermic reaction on the first electrode 106 of the reaction portion 67 and heating the heated fluid passage 57 is supplied to the electric heat conversion portion 68 which is the heater so as to increase the temperature of the electric heat conversion portion 68. The electric heat conversion portion 68 heats the portion of the heated fluid passage 57 more upstream than the reaction portion 67 and thereby heats a sensible heat portion of the fluid inside the heated fluid passage 57 in advance so that it can supply the hot water of necessary temperature and so on more promptly. Thus, it is possible to constitute the thermal storage apparatus utilizing the heat the electrical energy of the electricity generated on radiation.

It is also possible to provide the electric heat conversion portion 68 in one of the energy storing thermal storage material tank A of 42 and the energy storing thermal storage material tank B of 43 or in both of them. In this case, it is possible to use the heat generated in the electric heat conversion portion 68 as the heat of vaporization and sensible heat generated on supplying to the reaction portion 67 the thermal storage material in the energy storing state from the energy storing thermal storage material tank A of 42 and the energy storing thermal storage material tank B of 43. It is also possible to provide an electricity storage portion between the electric terminal 64 and the electric heat conversion portion 68.

The electric heat conversion portion 68 is an example of electric heat conversion means of the present invention.

In the case of such a configuration, it is possible to improve thermal storage efficiency by using the electricity generated on radiation for heating of heated objects on utilizing the heat and reducing the loss.

(Sixth Embodiment)

The heat source system according to a sixth embodiment of the present invention will be described as to its configuration and operation based on FIGS. 17 and 18. The heat source system according to the sixth embodiment is a system using the electric heat conversion portion 68 of the thermal storage apparatus of the fifth embodiment as the heat pump and further comprising a cold storage portion.

Figure 17:
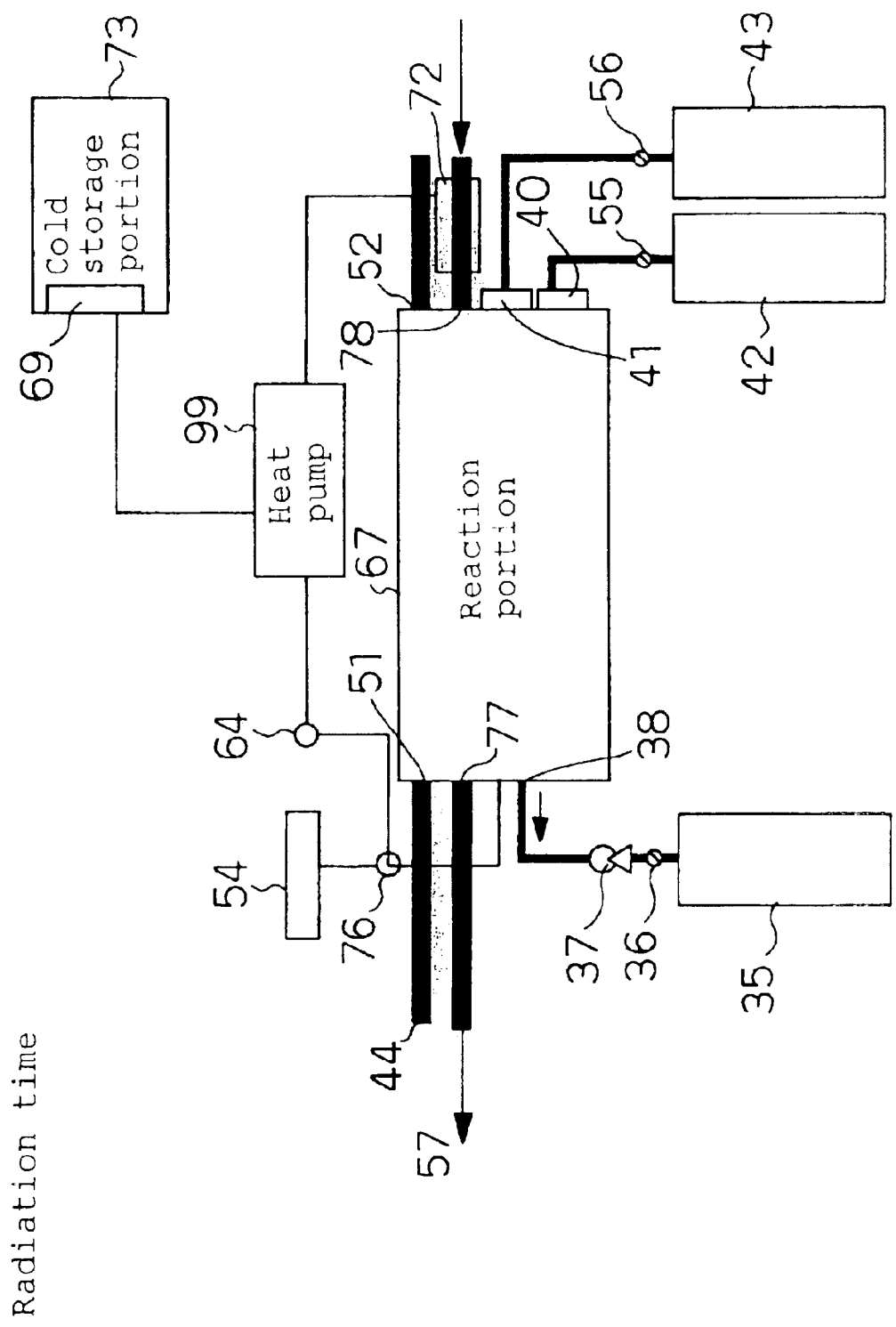
FIG. 17 is a schematic view of a heat source system according to a sixth embodiment of the present invention.

FIG. 17 shows a block diagram of the heat source system according to the sixth embodiment of the present invention. FIG. 18 shows a block diagram of a heat pump 99 shown in FIG. 17. In FIG. 17, the portions indicated by the same reference symbols as in FIG. 16 are the same as those in FIG. 16.

Figure 18:
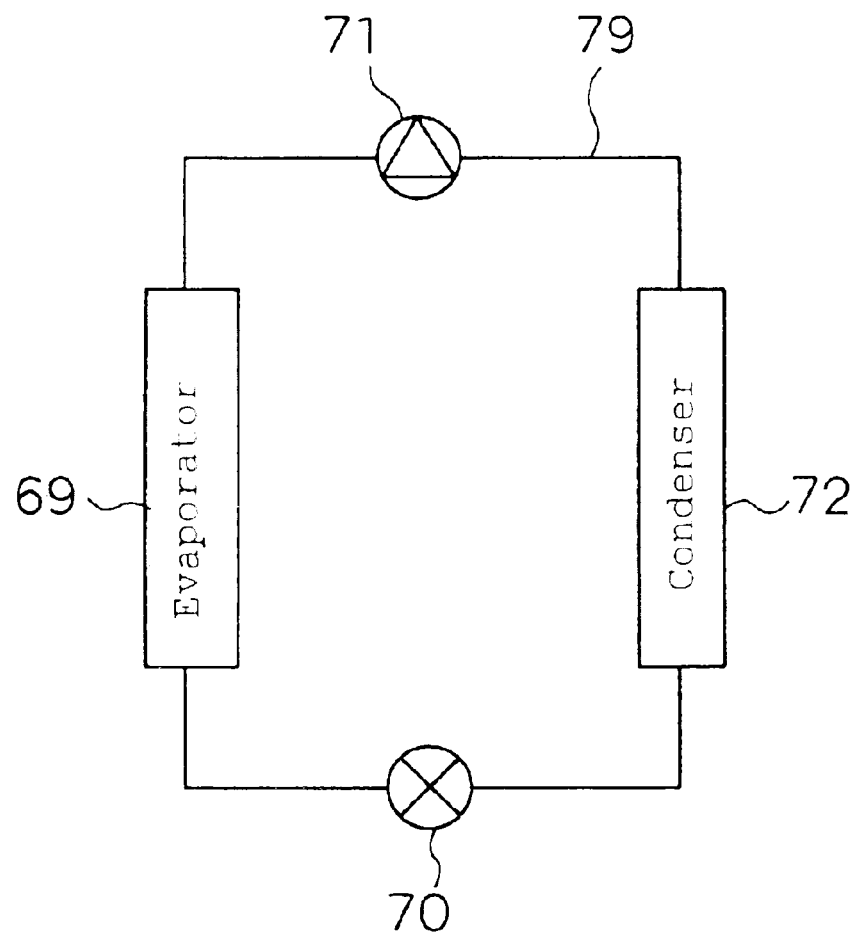
FIG. 18 is a schematic view of a heat pump used for the heat source system according to the sixth embodiment of the present invention.

As shown in FIG. 18, the heat pump 99 is basically comprised of an evaporator 69, an expansion valve 70, a compressor 71, a condenser 72 and a cooling medium passage 79 for circulating a cooling medium among them, and forms a refrigeration cycle. FIG. 17 omits the expansion valve 70, compressor 71 and the cooling medium passage 79 for connecting them, and only shows a positional relationship among the evaporator 69, condenser 72 and the thermal storage apparatus according to the present invention.

It is possible, by using for the heat pump 99 the electricity generated in the reaction portion 67 simultaneously with the heat generation, to simultaneously generate the cold with the evaporator 69 and the heat with the condenser 72 connected to another compressor 71 with high energy efficiency on the radiation. For instance, when forming the heat of 40 to 50 degrees C. or so with the condenser 72 by compressing $CO_2$ with the compressor 71, it is possible, by using $CO_2$ as the cooling medium for the heat pump 99, to generate the cold of −2 to −4 degrees C. or so depending on the heat capacity of a cooling subject, for instance, on the evaporator 69 after going through the expansion valve 70.

Therefore, it is possible to supply the heat formed by the condenser 72 to the upstream side of the heated fluid passage 57 and store the cold generated by the evaporator 69 in a cold storage portion 73 so as to supply it separately as required.

The cold storage portion 73 provided to the heat source system according to the sixth embodiment may be a so-called an ice thermal storage tank comprised of a latent heat storage agent such as ice and the heat exchanger for instance.

In the case of using the heat pump as the means of forming the hot water of the fluid passage 44 on thermal storage, it is desirable to render it in common with the heat pump 99 used on radiation. In that case, for instance, the condensers 72 are provided to both the fluid passage 44 and the heated fluid passage 57, and the passage is switched so that it will be on the fluid passage 44 side on thermal storage and on the heated fluid passage 57 side on radiation.

In the case where a demand for the cold is greater, it is feasible to render the cold storage portion 73 as large-capacity and store the cold generated on using the heat pump 99 as the means of forming the hot water. In the case where the cold is not necessary, the cold storage portion 73 may be omitted to diffuse the cold as-is in the air.

Figure 19:
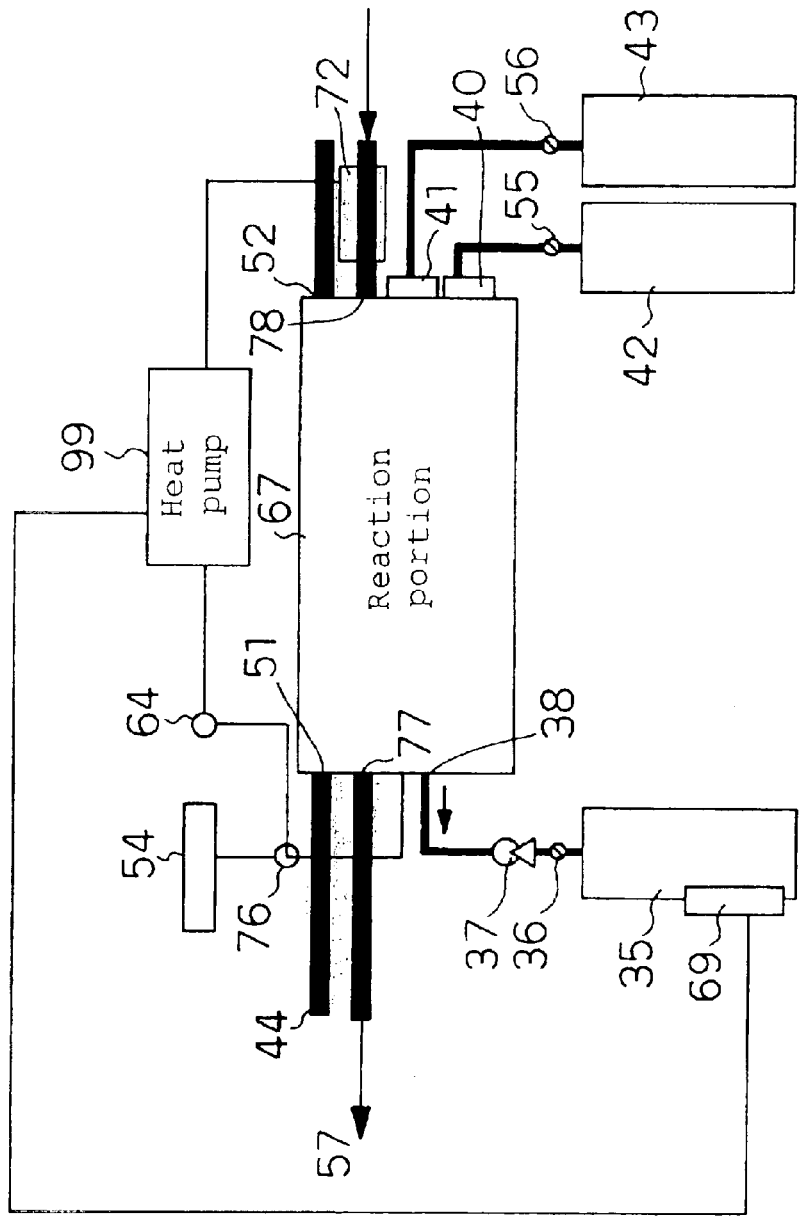
FIG. 19 is a schematic view of another configuration of the heat source system according to the sixth embodiment of the present invention.
Figure 20:
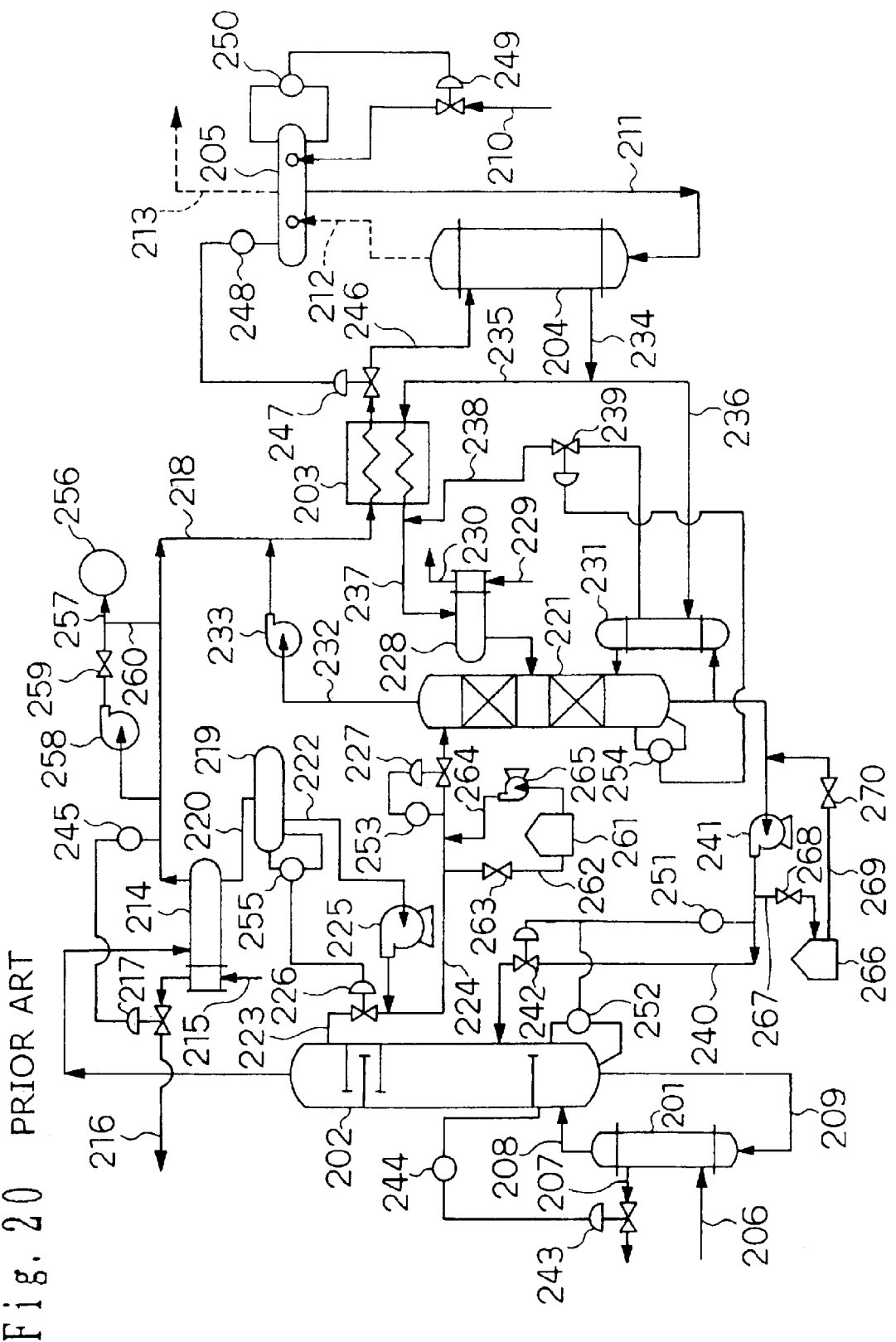
FIG. 20 is a diagram showing the configuration of a chemical heat pump as the the conventional thermal storage apparatus.

FIG. 19 shows another form of the sixth embodiment of the present invention. While FIG. 17 shows the configuration in which the cold generated on the evaporator 69 in the heat pump 99 is stored and separately used, FIG. 19 shows another configuration in which it thermally contacts with the thermal storage material tank 35. This configuration has the heat formed by the condenser 72 supplied to the upstream side of the heated fluid passage 57 and has the thermal storage material tank 35 cooled on heat generation so that it facilitates the progress of the storage by condensation of the 2-propanol generated by coupling of the thermal storage material in the energy storing state so as to have the effect of promoting the exothermic reaction.

The same effect can be obtained by using the thermoelectric element instead of using the heat pump 99.

It is possible, by having the above configuration, to further miniaturize the thermal storage apparatus and generate the heat and cold with high energy efficiency by using the electricity generated on radiation to store the cold so as to allow the use according to the demand or promotion of the reaction and improve the thermal storage efficiency.

The embodiments showed the example of a 2-propanol/acetone and hydrogen system as an example of an alcohol/ketone (aldehyde) and hydrogen system. However, they are basically usable in the case where the condition of the formula 2 is satisfied with the condition of the formula 1 and the storability of the thermal storage material in the energy storing state is suitable. For instance, it is possible to use those having different carbon numbers and OH bases of poly-alcohols and so on such as methanol, ethanol and butanol as alcohol according to use conditions instead of the 2-propanol. In the case of using saturated hydrocarbon/aromatic hydrocarbon and hydrogen system, it is also possible to use cis-decalin/naphthalene and hydrogen system and so on although provided supplemental energy equivalent to ΔG becomes higher.

The embodiments showed organic chemical reactions. However, according to the present principle even in the case of other systems using inorganic chemical reactions and hydrogen absorbing reactions using the hydrogen absorbing alloys, it is sufficient if they are the systems which can use an electrochemical reaction or a photocatalytic reaction at the same time. In addition to use in a suspension state, it is possible, as for solids such as the hydrogen absorbing alloys, to provide the hydrogen absorbing alloys instead of the electrode with a catalyst 12 on the anode side of the thermal storage reaction portion 5 so as to double as the thermal storage material tank 1.

The embodiments used the electricity and light as the supplemental energy respectively. However, it is also possible to use the two at the same time. And the fluid circulating in the fluid passage 10 may be the hot water or another heat medium such as oil or a cooling medium.

As for the method of heating the 2-propanol which is the thermal storage material, the embodiments used the method of heating it with the hot water circulating in the fluid passages 10 and 44. However, it may be another method of heating by means of other heat medium, cold medium, heater, hot air and so on.

The thermal storage apparatus, thermal storage method and heat source system according to the present invention are useful as the thermal storage apparatus, thermal storage method and heat source system using them which use a chemical thermal storage method capable of storing the heat of the domestic hot water supply level at a higher density and effectively utilizing the electricity generated on radiation.

What is claimed is:

1. A thermal storage method wherein, where thermal storage temperature is T, variation in enthalpy in a chemical reaction is ΔH, variation in entropy is ΔS, and variation in free energy is ΔG, a thermal storage material satisfying a relationship of

TΔS≧ΔG is used under a condition or

ΔH>0 so as to promote a reaction that changes said thermal storage material into a thermal storage material in an energy storing state by adding supplemental energy when changing said thermal storage material into said thermal storage material in the energy storing state by decomposing or separating said thermal storage material; and wherein said supplemental energy is light, and the reaction that changes said thermal storage material into said thermal storage material in the energy storing state by adding the supplemental energy is a photocatalytic reaction.

2. The thermal storage method according to claim 1, wherein said thermal storage material and said thermal storage material in the energy storing state include a substance condensable or a substance storable by absorption and convertible to an ion-conducting substance.

3. The thermal storage method according to claim 2, wherein said ion-conducting substance is proton.

4. The thermal storage method according to claim 1, wherein said thermal storage material includes a substance for absorbing heat by a dehydrogenating reaction of O—H coupling and C—H coupling.

5. A thermal storage apparatus comprising:

a heat source;

a supplemental energy supply portion for adding said supplemental energy;

a thermal storage reaction portion for changing said thermal storage material into said thermal storage material in the energy storing state by decomposing or separating said thermal storage material with heat from said heat source and said supplemental energy from said supplemental energy supply portion;

an energy storing thermal storage material storage portion for storing said thermal storage material in the energy storing state;

exothermic reaction portion for coupling said thermal storage material in the energy storing state;

a heated fluid passage for receiving heat from said exothermic reaction portion; and a supplemental energy control portion for adjusting an amount of said supplemental energy correspondingly to change in temperature of said thermal storage reaction portion.

6. A thermal storage apparatus comprising:

a heat source;

a supplemental energy supply portion for adding said supplemental energy;

a thermal storage reaction portion for changing said thermal storage material into said thermal storage material in the energy storing state by decomposing or separating said thermal storage material with heat from said heat source and said supplemental energy from said supplemental energy supply portion;

an energy storing thermal storage material storage portion for storing said thermal storage material in the energy storing state;

exothermic reaction portion for coupling said thermal storage material in the energy storing state;

a heated fluid passage for receiving heat from said exothermic reaction portion; and wherein said supplemental energy is electricity;

said thermal storage reaction portion has electrodes and an electrolyte;

said supplemental energy supply portion adds a potential difference between said electrodes; and said thermal storage reaction portion promotes said decomposition or separation reaction with said added potential difference.

7. A thermal storage apparatus comprising:

a heat source;

a supplemental energy supply portion for adding said supplemental energy;

a thermal storage reaction portion for changing said thermal storage material into said thermal storage material in the energy storing state by decomposing or separating said thermal storage material with heat from said heat source and said supplemental energy from said supplemental energy supply portion;

an energy storing thermal storage material storage portion for storing said thermal storage material in the energy storing state;

exothermic reaction portion for coupling said thermal storage material in the energy storing state;

a heated fluid passage for receiving heat from said exothermic reaction portion; and wherein the supplemental energy is light;

said thermal storage reaction portion has a light exposure surface; and said supplemental energy supply portion supplies the light to said light exposure surface so as to promote the decomposition or separation.

8. The thermal storage apparatus according to claim 5, claim 6, or claim 7, further comprising:

a heating fluid passage, having a part of it placed in said thermal storage reaction portion, for heating said thermal storage reaction portion with a heating fluid circulating inside it;

a thermal storage material storage portion for storing said thermal storage material, wherein said heat source is said heating fluid passage; and said heating fluid passage contacts with said thermal storage material storage portion more upstream side than said thermal storage reaction portion so as to heat said thermal storage material storage portion.

9. The thermal storage apparatus according to claim 5, claim 6, or claim 7, further comprising a heat exchanger between said energy storing thermal storage material storage portion and said thermal storage reaction portion or in said energy storing thermal storage material storage portion, wherein said heat source is said heat exchanger; and said heat exchanger recovers the heat of said thermal storage material in the energy storing state and heats said thermal storage material with said recovered heat.

10. The thermal storage apparatus according to claim 6, wherein said exothermic reaction portion has an electrode portion with a first electrode and a second electrode placed on both sides of the electrolyte and electric terminals connected to said first electrode and said second electrode, supplies at least one kind of said thermal storage material in the energy storing state to said first electrode and supplies other thermal storage material in the energy storing state to said second electrode, so that said thermal storage material in the energy storing state supplied to said first electrode is ionized and moves to said second electrode by way of said electrolyte to cause said electric terminals to generate electricity, and heated fluid of said heated fluid passage is heated by the heat generated on generating the thermal storage material on said second electrode.

11. The thermal storage apparatus according to claim 10, wherein said exothermic reaction portion doubles as said thermal storage reaction portion, and said apparatus comprises a switching means for switching said electric terminals so that said electric terminals are connected (1) to said supplemental energy supply portion when separating or decomposing said thermal storage material in said exothermic reaction portion and (2) to the electric terminals for taking out electricity when coupling said thermal storage material in the energy storing state in said exothermic reaction portion respectively.

12. The thermal storage apparatus according to claim 10, further comprising an electricity storage means, connected to said electric terminals, for storing electricity generated on said electric terminals, and said electricity storage means supplies the electricity to said thermal storage reaction portion via said supplemental energy supply portion so as to promote decomposition or separation of said thermal storage material.

13. The thermal storage apparatus according to claim 12, further comprising a thermal storage reaction portion heating means for heating said thermal storage reaction portion by having the electricity supplied from said electricity storage means on decomposing or separating said thermal storage material.

14. The thermal storage apparatus according to claim 10, further comprising an electric heat conversion means connected to said electric terminals and placed to thermally contact said heated fluid passage, and wherein said electric heat conversion means converts the electricity generated on generating coupling of said thermal storage material in the energy storing state into heat so as t heat said heated fluid passage.

15. The thermal storage apparatus according to claim 10, further comprising an electric heat conversion means connected to said electric terminals and placed to thermally contact said energy storing thermal storage material storage portion, and wherein said electric heat conversion means converts the electricity generated on generating coupling of said thermal storage material in the energy storing state into heat so as to heat said energy storing thermal storage material storage portion.

16. A heat source system, further comprising the thermal storage apparatus according to claim 14 or 15, wherein said electric heat conversion means is a heat pump; and said heat pump generates heat and cold from the electricity generated on generating coupling of said thermal storage material in the energy storing state, heats said heated fluid passage and/or said energy storing thermal storage material storage portion with said heat, and cools said energy storing thermal storage material storage portion with the cold.

\* \* \* \* \*

UNITED STATES PATENT AND TRADEMARK OFFICE
CERTIFICATE OF CORRECTION

PATENT NO. : 7,085,483 B2 Page 1 of 1
APPLICATION NO. : 10/828713
DATED : August 1, 2006
INVENTOR(S) : Tetsuo Terashima et al.

It is certified that error appears in the above-identified patent and that said Letters Patent is hereby corrected as shown below:

Column 29

Line 26, "or" should read -- of --.

Column 32

Line 19, "t" should read -- to --.

Signed and Sealed this

Nineteenth Day of December, 2006

JON W. DUDAS
*Director of the United States Patent and Trademark Office*